(12) United States Patent
Dhanabalan et al.

(10) Patent No.: US 11,360,943 B2
(45) Date of Patent: Jun. 14, 2022

(54) UNIFIED FILE STORAGE SYSTEM

(71) Applicant: Citrix Systems, Inc., Fort Lauderdale, FL (US)

(72) Inventors: Praveen Raja Dhanabalan, Bangalore (IN); Anuj Magazine, Bangalore (IN); Anudeep Athlur, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 43 days.

(21) Appl. No.: 16/892,539

(22) Filed: Jun. 4, 2020

(65) Prior Publication Data
US 2021/0318990 A1    Oct. 14, 2021

(30) Foreign Application Priority Data

Apr. 13, 2020  (IN) .............................. 202041015903

(51) Int. Cl.
*G06F 16/00* (2019.01)
*G06F 16/178* (2019.01)
*G06F 16/13* (2019.01)

(52) U.S. Cl.
CPC ............ *G06F 16/178* (2019.01); *G06F 16/13* (2019.01)

(58) Field of Classification Search
CPC ............................... G06F 16/178; G06F 16/13
USPC .................................................. 707/626, 741
See application file for complete search history.

(56) References Cited

U.S. PATENT DOCUMENTS

| | | |
|---|---|---|
| 5,862,346 A | 1/1999 | Kley et al. |
| 6,321,236 B1 | 11/2001 | Zollinger et al. |
| 6,671,757 B1 | 12/2003 | Multer et al. |
| 7,062,515 B1 | 6/2006 | Thomas et al. |
| 7,680,835 B2 | 3/2010 | MacLaurin et al. |
| 7,720,920 B2 | 5/2010 | Singh et al. |
| 7,885,925 B1 | 2/2011 | Strong et al. |
| 7,925,790 B2 | 4/2011 | Xue et al. |
| 8,793,374 B2 | 7/2014 | Hesselink et al. |
| 9,143,561 B2 | 9/2015 | Manzano |
| 9,519,526 B2 | 12/2016 | Ghods et al. |
| 10,089,324 B2 | 10/2018 | Thomas et al. |
| 2002/0087588 A1 | 7/2002 | McBride et al. |

(Continued)

FOREIGN PATENT DOCUMENTS

| | | |
|---|---|---|
| WO | 2016120683 A1 | 8/2016 |
| WO | 2019112811 A1 | 6/2019 |

OTHER PUBLICATIONS

Extended European Search Report dated Aug. 13, 2021 for European Patent Application No. 21164393.7.

*Primary Examiner* — Chelcie L Daye
(74) *Attorney, Agent, or Firm* — Pierce Atwood LLP

(57) ABSTRACT

A computing system may store a first file in a system repository that is to be synchronized with at least a first repository associated with a first client device and a second repository associated with a second client device. The computing system may determine that the first repository is to receive a downloaded copy of at least a portion of the first file, and may cause a copy of the at least a portion of the first file to be downloaded from the system repository to the first repository. Based at least in part on the computing system determining that the first repository is to receive the downloaded copy, an identifier of the at least a portion of first file may be stored in the second repository without storing a copy of the at least a portion of the first file in the second repository.

21 Claims, 15 Drawing Sheets

(56) References Cited

U.S. PATENT DOCUMENTS

| | | | |
|---|---|---|---|
| 2002/0174180 A1 | 11/2002 | Brown et al. | |
| 2005/0055352 A1 | 3/2005 | White et al. | |
| 2006/0101064 A1 | 5/2006 | Strong et al. | |
| 2006/0230016 A1* | 10/2006 | Cunningham | G06F 16/24549 |
| 2006/0230076 A1* | 10/2006 | Gounares | G06F 9/38 |
| 2007/0143503 A1 | 6/2007 | Gupta et al. | |
| 2007/0156434 A1 | 7/2007 | Martia et al. | |
| 2007/0180084 A1 | 8/2007 | Mohanty | |
| 2007/0250507 A1 | 10/2007 | Haager et al. | |
| 2008/0243847 A1 | 10/2008 | Rasmussen | |
| 2011/0078149 A1* | 3/2011 | Falkenburg | G06F 16/134 707/741 |

\* cited by examiner

| Folder ID | File ID | Download | Ghost |
|---|---|---|---|
| Folder 1 | File 1 | D1 | D2, D3 |
| Folder 1 | File 2 | D2 | D1, D3 |
| Folder 1 | File 3 | None | D1, D2, D3 |
| Folder 1 | File 4 | Too Large | D1, D2, D3 |

File Assignments

1104 — Download
1106 — Ghost

| Folder ID | File ID | Download | Temporary | Ghost |
|---|---|---|---|---|
| Folder 1 | File 1 | D1 | D2 | D3 |
| Folder 1 | File 2 | D2 | - | D1, D3 |
| Folder 1 | File 3 | None | - | D1, D2, D3 |
| Folder 1 | File 4 | Too Large | - | D1, D2, D3 |

File Assignments

1104 — Download
1102 — Temporary
1106 — Ghost

Synchronization Folder Profiles

| Folder ID | User ID | Total Storage | Available Storage |
|---|---|---|---|
| Folder 1 | User 1 | 20 GB | 3 GB |
| Folder 2 | User 2 | 100 GB | 80 GB |
| Folder 3 | User 3 | 50 GB | 35 GB |
| Folder 4 | User 4 | 100 GB | 91 GB |

FIG. 12A

File Profiles

| File ID | Client Device ID | File Type | File Purpose | Content Category | File Size | Folder ID | Last Access |
|---|---|---|---|---|---|---|---|
| File 1 | - | Spreadsheet | Work | Financial | 8 MB | Folder 1 | 2020-01-05 |
| File 2 | - | Video | Personal | Entertainment | 100 MB | Folder 1 | 2020-03-03 |
| File 3 | D1 | Word Processor | Work | Technical | 50 MB | Folder 1 | 2019-12-10 |
| File 4 | - | Presentation | Work | Educational | 1 GB | Folder 1 | 2020-03-24 |

FIG. 12B

User Preferences

| User ID | File Type | File Purpose | Content Category | File Size | Device ID |
|---|---|---|---|---|---|
| U1 | Any | Personal | Any | Any | D3 |
| U1 | Image | Any | Any | Any | D3 |
| U1 | Video | Work | Technical | > 10 GB | D1 |
| U1 | Video | Work | Educational | > 10 GB | D2 |

FIG. 12C

Device Profiles

| Device ID | User ID | Total Storage | Available Storage | Device Type | Device Purpose | % Usage | Available Bandwidth |
|---|---|---|---|---|---|---|---|
| D1 | U1 | 10 GB | 1 GB | Desktop | Work | 62 | 100 Mbps |
| D2 | U1 | 5 GB | 4 GB | Laptop | Work | 21 | 25 Mbps |
| D3 | U1 | 2 GB | 0 GB | Mobile | Personal | 10 | 12 Mbps |
| D4 | U1 | 25 GB | 15 GB | Virtual | Work | 7 | 100 Mbps |

FIG. 12D

UNIFIED FILE STORAGE SYSTEM

CROSS-REFERENCE TO RELATED APPLICATIONS

This application claims priority under 35 U.S.C. § 119(a) to Provisional Application No. 202041015903, entitled UNIFIED FILE STORAGE SYSTEM, which was filed with the Indian Patent Office on Apr. 13, 2020, the entire contents of which are incorporated herein by reference for all purposes.

BACKGROUND

Various file sharing systems have been developed that allow users to share files or other data. ShareFile®, offered by Citrix Systems, Inc., of Fort Lauderdale, Fla., is one example of such a file sharing system.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves storing, by a computing system, a first file in a system repository that is to be synchronized with at least a first repository associated with a first client device and a second repository associated with a second client device; determining, by the computing system, that the first repository is to receive a downloaded copy of at least a portion of the first file; causing, by the computing system, a copy of the at least a portion of the first file to be downloaded from the system repository to the first repository; and based at least in part on the computing system determining that the first repository is to receive the downloaded copy, causing an identifier of the at least a portion of first file to be stored in the second repository without storing a copy of the at least a portion of the first file in the second repository.

In some disclosed embodiments, a computing system comprises at least one processor and at least one computer-readable medium encoded with instructions which, when executed by the at least one processor, cause the computing system to store a first file in a system repository that is to be synchronized with at least a first repository associated with a first client device and a second repository associated with a second client device, to determine that the first repository is to receive a downloaded copy of at least a portion of the first file, to cause a copy of the at least a portion of the first file to be downloaded from the system repository to the first repository, and to cause, based at least in part on the computing system determining that the first repository is to receive the downloaded copy, an identifier of the at least a portion of first file to be stored in the second repository without storing a copy of the at least a portion of the first file in the second repository.

In some disclosed embodiments, at least one non-transitory computer-readable medium is encoded with instructions which, when executed by at least one processor of a computing system, cause the computing system to store a first file in a system repository that is to be synchronized with at least a first repository associated with a first client device and a second repository associated with a second client device, to determine that the first repository is to receive a downloaded copy of at least a portion of the first file, to cause a copy of the at least a portion of the first file to be downloaded from the system repository to the first repository, and to cause, based at least in part on the computing system determining that the first repository is to receive the downloaded copy, an identifier of the at least a portion of first file to be stored in the second repository without storing a copy of the at least a portion of the first file in the second repository.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 11A shows a first example of a "file assignments" table that may be populated and/or referenced by the synchronization engine and the file access engine shown in FIG. 6;

FIG. 11B shows a second example of a "file assignments" table that may be populated and/or referenced by the synchronization engine and the file access engine shown in FIG. 6;

FIG. 12A shows an example of a "synchronization folder profiles" table that may be populated and/or referenced by the synchronization engine and the file access engine shown in FIG. 6;

FIG. 12B shows an example of a "file profiles" table that may be populated and/or referenced by the synchronization engine shown in FIG. 6;

FIG. 12C shows an example of a "user preferences" table that may be populated and/or referenced by the synchronization engine shown in FIG. 6;

FIG. 12D shows an example of a "device profiles" table that may be populated and/or referenced by the synchronization engine and the file access engine shown in FIG. 6;

DETAILED DESCRIPTION

Figure 1:
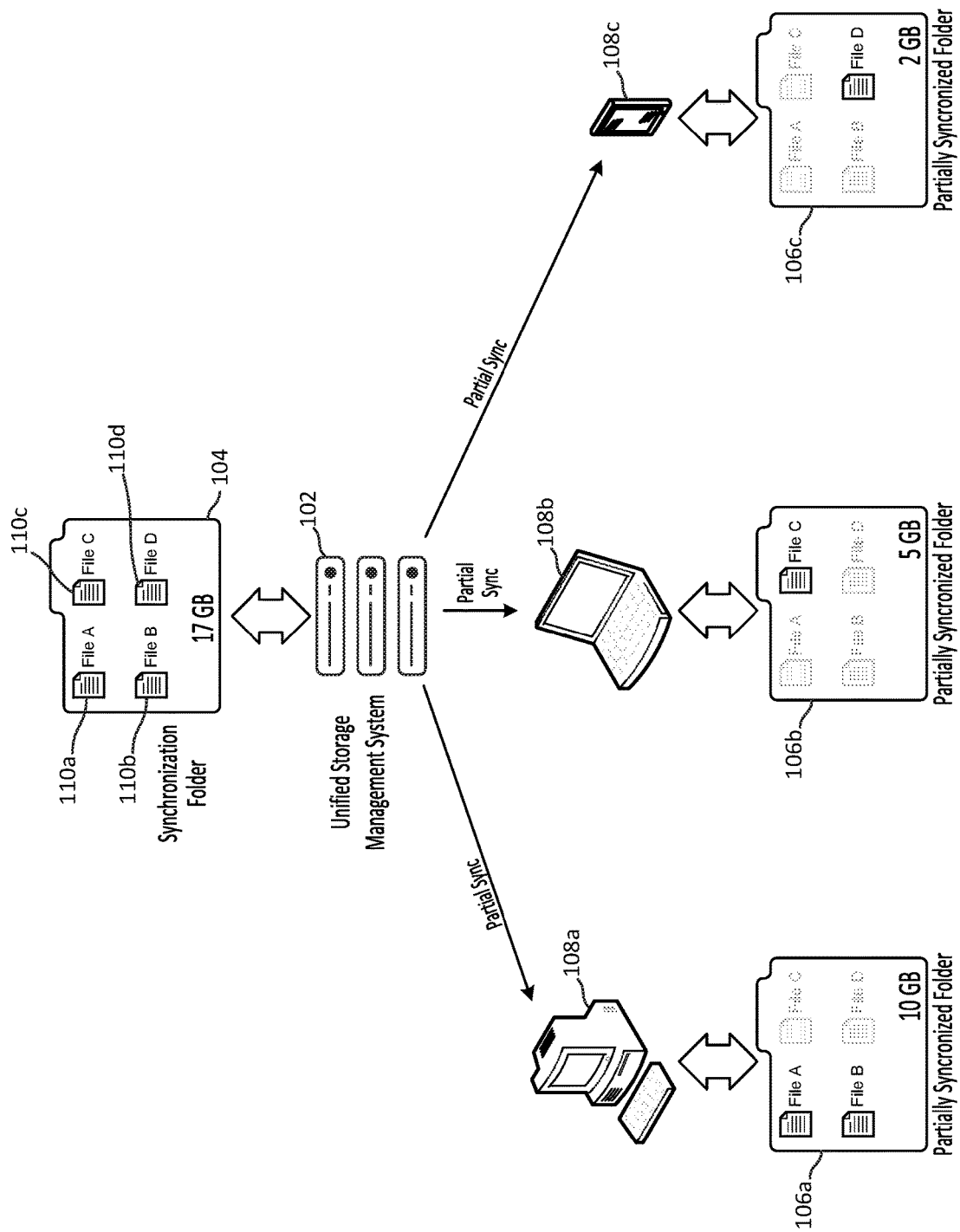
FIG. 1 is diagram introducing a unified file storage system configured in accordance with some embodiments of the present disclosure.

For purposes of reading the description of the various embodiments below, the following descriptions of the sections of the specification and their respective contents may be helpful:

Section A provides an introduction to example embodiments of a unified file storage system that is distributed across multiple devices;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes example embodiments of systems for providing file sharing over networks;

Section F provides a more detailed description of example embodiments of the unified file storage system that was introduced above in Section A;

Section G describes example implementations of methods, systems/devices, and computer-readable media in accordance with the present disclosure.

A. Introduction to Example Embodiments of a Unified File Storage System

Some file sharing systems allow for the contents of a server-based file repository (e.g., a file folder) to be automatically synchronized with a corresponding client-based file repository. For example, in some implementations of the ShareFile® system, a portion of the available storage on a client device may be allocated to a client-based file folder that a user can access using a ShareFile® mobile app or a ShareFile® desktop app installed on the client device. In such a system, a user of the client device can identify a server-based file folder that is to be automatically synchronized with the client-based file folder, such that any time a new file is added to the server-based file folder, that file will be automatically downloaded to the client-based file folder, either immediately (if the client device is currently online with the file sharing system), or as soon as the client device comes online with the file sharing system (if the client device was offline with the system at the time the new file was added). Such an "auto-syncing" technique can be quite beneficial, as it enables users to have prompt local access to all of the files that have been added to the server-based folder, rather having to wait while respective files are downloaded from the file sharing system at the time the user wants to access them.

The amount of storage that is allocated for use by a file management application (e.g., a ShareFile® mobile app or a ShareFile® desktop app) on a client device is not always sufficient to hold all of the files contained in the server-based file folder that is to be synchronized with the client-based file folder. For example, mobile devices sometimes have limited storage space available for use by the file sharing system. Accordingly, rather than downloading all of the files from the server-based folder to the client-based folder, some of the files may be "ghosted" in the client-based folder. That is, the client-based folder may include only identifiers (e.g., a partially-transparent icon and associated metadata) for certain files, rather than the content of the files themselves. For a user to locally access such ghosted files, the user has to wait for them to be downloaded from the file sharing system. In some situations, such a download operation can take a significant amount of time and thus result in a poor user experience.

The inventors have recognized and appreciated that users often have multiple client devices available to them that are each capable of accessing a file sharing system, and that it is not necessary for the client-based file folders on different client devices to be synchronized with a server-based file folder in the same way. Offered is a system in which a set of files contained in a server-based file folder may be partially synchronized with respective client-based file folders in different ways so that each client-based folder may have a different set of files locally stored in it. In such a system, following the synchronization process, one or more of the files in the server-based repository may be locally stored in fewer than all of the client-based repositories. Described, among other things, are techniques for identifying which of a user's several devices the user is most likely to use to access a particular file that is being added to the server-based repository, and causing that particular file to be downloaded to the client-based repository of identified device and ghosted in the client repositories of the other devices. As such, the respective files that are added to a server-based repository may be "assigned" to different ones of a user's devices, so that each assigned file can be found locally on at least one of the user's devices and preferably on the device the user is mostly likely to use to access that particular file.

The above-described concept is illustrated in FIG. 1. As shown, a unified storage management system 102 may, in some implementations, cause the contents of a server-based synchronization folder 104 to be partially synchronized in different ways with respective client-based folders 106a, 106b, 106c. In illustrated example, the client-based folder 106a is stored on a desktop client 108a and has been allocated 10 gigabytes (GB) of storage space, the client-based folder 106b is stored on a laptop client 108b and has been allocated 5 GB of storage space, and the client-based folder 106c is stored on a mobile client 108c and has been allocated 2 GB of storage space. The synchronization folder 104, on the other hand, has 17 gigabytes (GB) of storage space, and thus has a storage capacity that is equal to the sum of the storage capacities of the three client-based folders 106*a*, 106*b*, 106*c*. As explained below, the client-based folders 106*a*, 106*b*, 106*c* may collectively define a "unified storage space" with which the contents of synchronization folder 104 may be synchronized as files are added to it. In the illustrated example, four files 110*a*, 110*b*, 110*c*, 110*d* have been added to the synchronization folder 104.

In some implementations, as files 110 are added to the synchronization folder 104, the unified storage management system 102 may "assign" those files to respective client devices 108, and may cause the three client-based folders 106*a*, 106*b*, 106*c* to be partially synchronized with the synchronization folder 104 in different ways in accordance with such file assignments. FIG. 1 illustrates a scenario in which (A) the files 110*a* and 110*b* have been assigned to the desktop client 108*a*, (B) the file 110*c* has been assigned to the laptop client 108*b*, and (C) the file 110*d* has been assigned to the mobile client 108*c*.

Based on such file assignments, the files 110*a* and 110*b* would have been automatically downloaded to the desktop client 108*a* during the synchronization process. The presence of the files 110*a* and 110*b* in the client-based folder 106*a* is indicated by the non-transparent icons representing those files in that folder. Because the files 110*a* and 110*b* were not assigned to the laptop client 108*b* or the mobile client 108*c*, however, those files would have been ghosted in the client-based folders 106*b* and 106*c*, rather than being downloaded to them. The absence of the files 110*a* and 110*b* from the client-based folders 106*b* and 106*c* is indicated by the semi-transparent icons representing those files in those folders. Also based on the above-noted file assignments, the file 110*c* would have been automatically downloaded to the laptop client 108*b* during the synchronization process. The presence of the file 110*c* in the client-based folder 106*b* is indicated by the non-transparent icon representing that file in that folder. Because the file 110*c* was not assigned to the desktop client 108*a* or the mobile client 108*c*, however, that file would have been ghosted in the client-based folders 106*a* and 106*c*, rather than being downloaded to them. The absence of the file 110*c* from the client-based folders 106*a* and 106*c* is indicated by the semi-transparent icons representing that file in those folders. Finally, based on the above-noted file assignments, the file 110*d* would have been automatically downloaded to the mobile client 108*c* during the synchronization process. The presence of the file 110*d* in the client-based folder 106*c* is indicated by the non-transparent icon representing that file in that folder. Because the file 110*d* was not assigned to the desktop client 108*a* or the laptop client 108*b*, however, those files would have been ghosted in the client-based folders 106*a* and 106*b*, rather than being downloaded to them. The absence of the file 110*d* from the client-based folders 106*a* and 106*b* is indicated by the semi-transparent icons representing that file in those folders.

The selection of the client device 108 to which a new file 110 uploaded to the synchronization folder 104 should be assigned may be determined in any of numerous ways and using any of a number of criteria. In some implementations, for example, a trained machine learning model or other algorithm may be used to evaluate one or more characteristics of the file 110 and/or the devices 108 to select the most appropriate client device 108 for the file 110. For example, in some implementations, the files 110 may each be assigned a file type indicator (e.g., "video," "spreadsheet," "presentation," etc.), a content indicator (e.g., "educational," "financial," "technical," etc.), and/or to a file purpose indicator (e.g., "personal" or "work"). Some or all of such indicators may be designated by the person who uploads the file to the synchronization folder 104 and/or may be made by the unified storage management system 102 via a computer-implemented evaluation of the name, header, and/or content of the file 110 that is uploaded. Additionally, in some implementations, the devices 108 may each be assigned (e.g., by a user, a system administrator, or otherwise) a device type indicator (e.g., "desktop," "laptop," "mobile," etc.) and/or a device purpose indicator (e.g., "personal" or "work"), and/or may be associated with a value indicating the percentage of the time the client device 108 is used as compared to the other client devices 108 and/or a value indicating a current available bandwidth between the client device 108 and the unified storage management system 102. In some implementations, some or all of the foregoing indicators and/or values may be encoded into a feature vector that may be processed by trained machine learning model to determine a ranked list of the devices 108 for the file 110 being evaluated. The file 110 may, for example, be assigned to the highest ranked client device 108 in at least some circumstances. In some implementations, such a machine-learning model may be retrained when a file access pattern indicates that a particular file assignment was inappropriate.

In some implementations, the device selection process may additionally or alternatively involve applying user-defined criteria for assignment of files 110 meeting one or more particular criteria to particular client devices 108. For example, as explained in more detail below, an engineer may opt to specify that any file with both a "work" indicator and a "technical" indicator are to be assigned to the desktop client 108*a*, or that all files with a "personal" indicator are to be assigned to the mobile client 108*c*. In some implementations, a mechanism may additionally or alternatively be employed to allow a particular file 110 to be assigned to a specific client device 108 at the time the file is uploaded to the system.

As described in more detail below, in situations in which a client-based folder 106 is selected but does not have adequate remaining storage for the file, one or more other files 110 in that folder may be "evicted," e.g., based on when they were last accessed, and then ghosted within the folder 106, to free up sufficient storage space for the new file 110. In some implementations, the new file may instead be ghosted in the selected folder in at least some circumstances, such as when the time that has elapsed since when the newly-uploaded file 110 was last accessed is greater than a threshold period. In some implementations, the determination of whether to evict a particular file from a given client device 108 may depend on whether that file 110 is present on another client device 108 that the given client device 108 is able to access via a local area network (LAN).

Additionally, in some implementations, if a file is too large for a particular client-based folder 106, e.g., the folder 106*c* of the mobile client 108*c*, the unified storage management system 102 may, in at least some circumstance, split the file into multiple parts and assign the different portions of the file to different devices. In some implementations, the primary client device 108 (e.g., the mobile client 108*c*) may establish a connection with one or more secondary devices (e.g., the laptop client 108*b*) to stream or otherwise transfer the corresponding part of the content of the "split" file to the primary device. In some implementations, a shared encryption token may be obtained from the unified storage management system 102 to protect the privacy of the information transferred from the secondary device to the primary device.

Further, as also described in more detail below, when a user desires to access a file 110 that is ghosted on the client device 108 the user is currently operating, the user may be apprised of the client device 108 to which that file 110 is currently assigned and/or may be apprised of one or more options for accessing the file 110 from that device, e.g., via a LAN connection with the other client device 108, a remote virtual desktop session with the other client device 108, etc. Further, in some implementations, the user may further be provided with the option of downloading the ghosted file from the unified storage management system 102. In some implementations, the latter option, i.e., downloading the file 110, may be accomplished by causing the unified storage management system 102 to assign the file 110 to the client device 108 the user is currently operating and possibly ghosting the file 110 on the client device 108 to which the file 110 is currently assigned.

Additional details and example implementations of embodiments of the present disclosure are set forth below in Section F, following a description of example systems and network environments in which such embodiments may be deployed.

B. Network Environment

Figure 2:
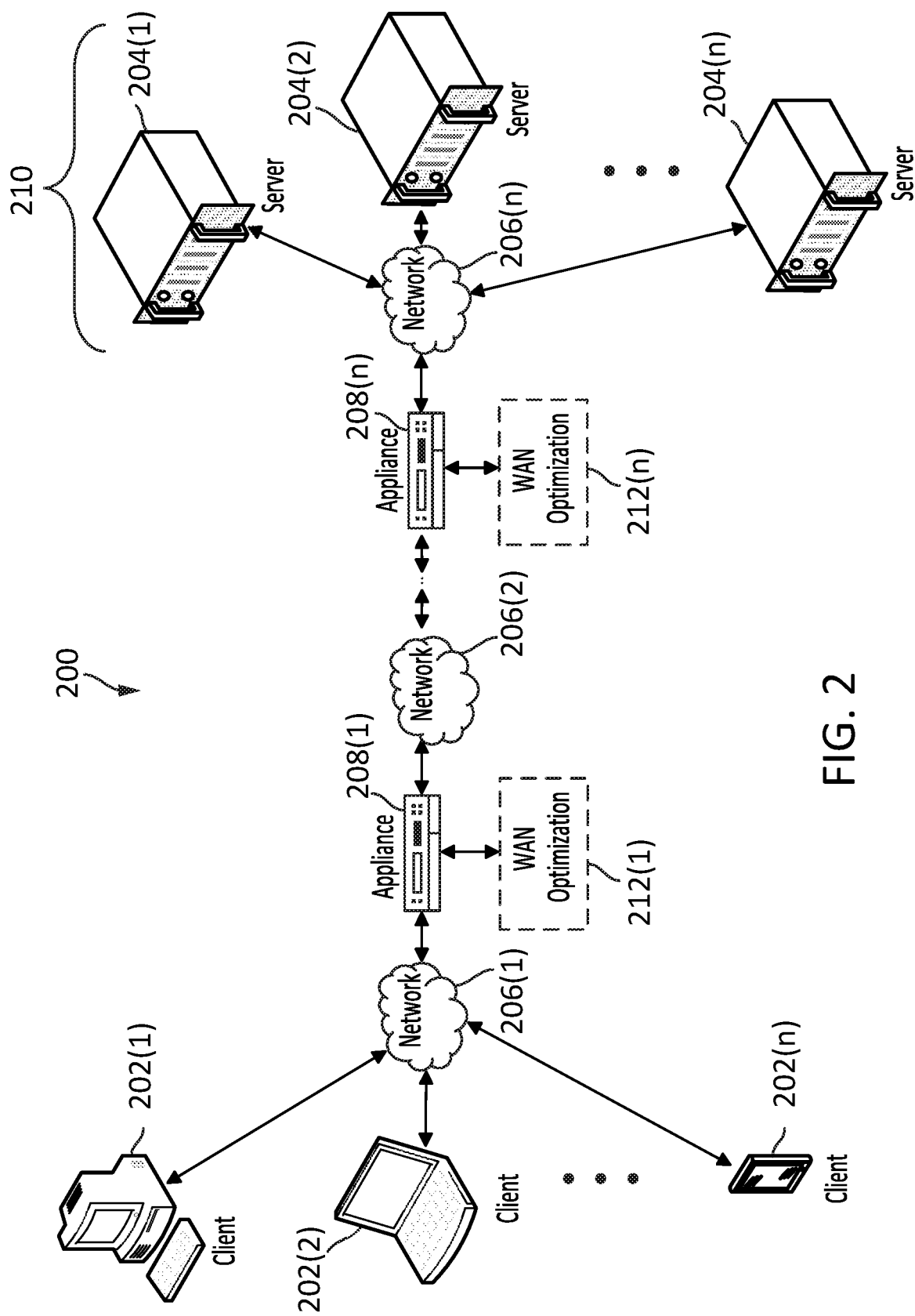
FIG. 2 is a diagram of a network environment in which some embodiments of the unified storage system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), interne protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FLa., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based)

from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FLa., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
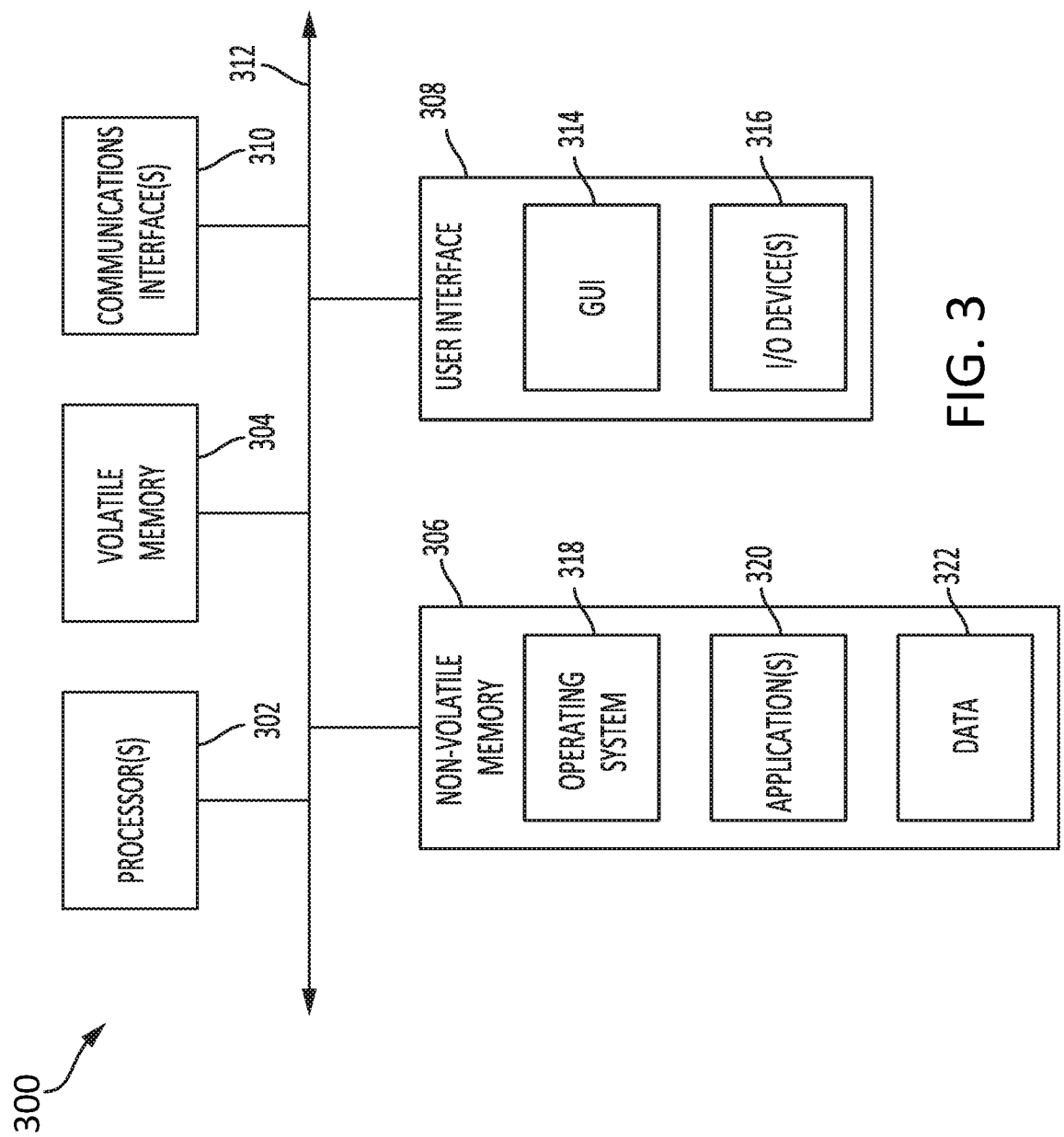
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
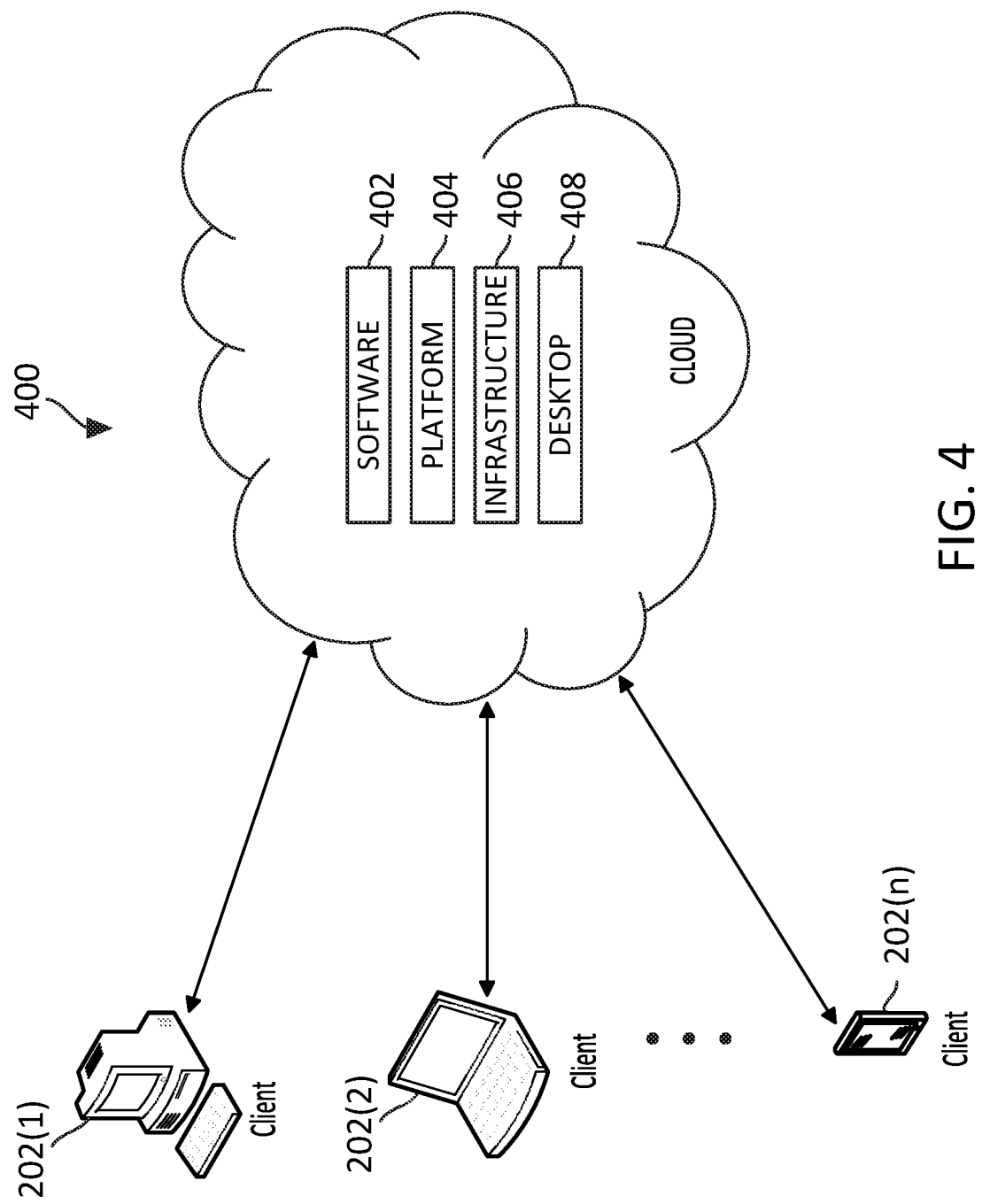
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Providing File Sharing Over Network(s)

Figure 5A:
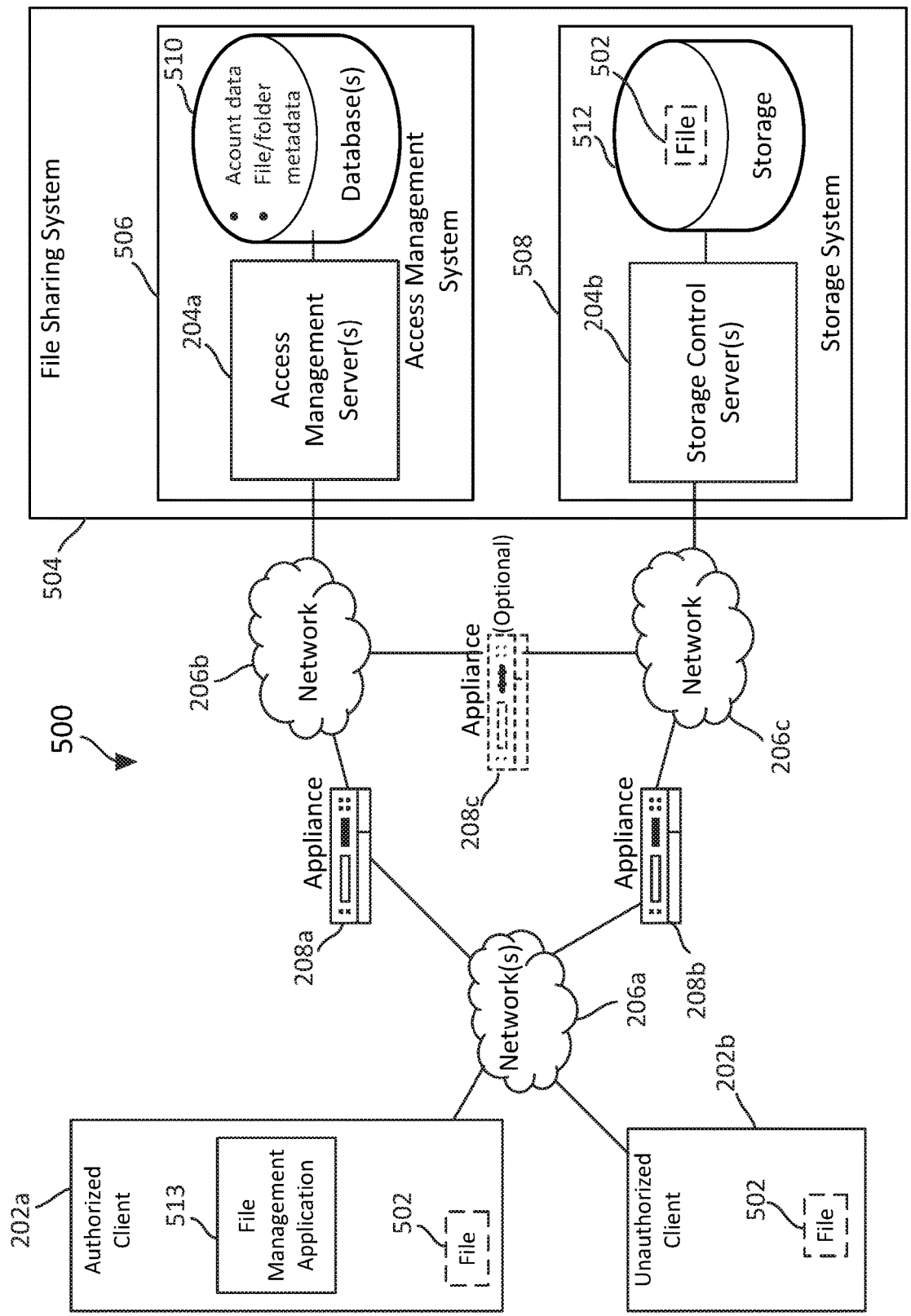
FIG. 5A is a diagram illustrating how a network computing environment like that shown in FIG. 2 may be configured to allow clients access to an example embodiment of a server-based file sharing system.

FIG. 5A shows an example network environment 500 for allowing an authorized client 202a and/or an unauthorized client 202b to upload a file 502 to a file sharing system 504 or download a file 502 from the file sharing system 504. The authorized client 202a may, for example, be a client 202 operated by a user having an active account with the file sharing system 504, while the unauthorized client 202b may be operated by a user who lacks such an account. As shown, in some embodiments, the authorized client 202a may include a file management application 513 with which a user of the authorized client 202a may access and/or manage the accessibility of one of more files 502 via the file sharing system 504. The file management application 513 may, for example, be a mobile or desktop application installed on the authorized client 202a (or in a computing environment accessible by the authorized client). The ShareFile® mobile app and the ShareFile® desktop app offered by Citrix Systems, Inc., of Fort Lauderdale, FLa., are examples of such preinstalled applications. In other embodiments, rather than being installed on the authorized client 202a, the file management application 513 may be executed by a web server (included with the file sharing system 504 or elsewhere) and provided to the authorized client 202a via one or more web pages.

As FIG. 5A illustrates, in some embodiments, the file sharing system 504 may include an access management system 506 and a storage system 508. As shown, the access management system 506 may include one or more access management servers 204a and a database(s) 510, and the storage system 508 may include one or more storage control servers 204b and a storage medium 512. In some embodiments, the access management server(s) 204a may, for example, allow a user of the file management application 513 to log in to his or her account, e.g., by entering a user name and password corresponding to account data stored in the database(s) 510. Once the user of the client 202a has logged in, the access management server 204a may enable the user to view (via the authorized client 202a) information identifying various folders represented in the storage medium 512, which is managed by the storage control server(s) 204b, as well as any files 502 contained within such folders. File/folder metadata stored in the database(s) 510 may be used to identify the files 502 and folders in the storage medium 512 to which a particular user has been provided access rights.

In some embodiments, the clients 202a, 202b may be connected to one or more networks 206a (which may include the Internet), the access management server(s) 204a may include webservers, and an appliance 208a may load balance requests from the authorized client 202a to such webservers. The database(s) 510 associated with the access management server(s) 204a may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202a, 202b are shown is FIG. 5A as stand-alone computers, it should be appreciated that one or both of the clients 202a, 202b shown in FIG. 5A may instead represent other types of computing devices or systems that can be operated by users. In some embodiments, for example, one or both of the authorized client 202a and the unauthorized client 202b may be implemented as a server-based virtual computing environment that can be remotely accessed using a separate computing device operated by users, such as described above.

In some embodiments, the access management system 506 may be logically separated from the storage system 508, such that files 502 and other data that are transferred between clients 202 and the storage system 508 do not pass through the access management system 506. Similar to the access management server(s) 204a, one or more appliances 208b may load-balance requests from the clients 202a, 202b received from the network(s) 206a (which may include the Internet) to the storage control server(s) 204b. In some embodiments, the storage control server(s) 204b and/or the storage medium 512 may be hosted by a cloud-based service provider (e.g., Amazon Web Services™ or Microsoft Azure™). In other embodiments, the storage control server(s) 204b and/or the storage medium 512 may be located at a data center managed by an enterprise of a client 202, or may be distributed among some combination of a cloud-based system and an enterprise system, or elsewhere.

After a user of the authorized client 202a has properly logged in to an access management server 204a, the server 204a may receive a request from the client 202a for access to one of the files 502 or folders to which the logged in user has access rights. The request may either be for the authorized client 202a to itself to obtain access to a file 502 or folder or to provide such access to the unauthorized client 202b. In some embodiments, in response to receiving an access request from an authorized client 202a, the access management server 204a may communicate with the storage control server(s) 204b (e.g., either over the Internet via appliances 208a and 208b or via an appliance 208c positioned between networks 206b and 206c) to obtain a token generated by the storage control server 204b that can subsequently be used to access the identified file 502 or folder.

In some implementations, the generated token may, for example, be sent to the authorized client 202a, and the authorized client 202a may then send a request for a file 502, including the token, to the storage control server(s) 202b. In other implementations, the authorized client 202a may send the generated token to the unauthorized client 202b so as to allow the unauthorized client 202b to send a request for the file 502, including the token, to the storage control server(s) 204b. In yet other implementations, an access management server 204a may, at the direction of the authorized client 202a, send the generated token directly to the unauthorized client 202b so as to allow the unauthorized client 202b to send a request for the file 502, including the token, to the storage control server(s) 204b. In any of the forgoing scenarios, the request sent to the storage control server(s) 204b may, in some embodiments, include a uniform resource locator (URL) that resolves to an internet protocol (IP) address of the storage control server(s) 204b, and the token may be appended to or otherwise accompany the URL. Accordingly, providing access to one or more clients 202 may be accomplished, for example, by causing the authorized client 202a to send a request to the URL address, or by sending an email, text message or other communication including the token-containing URL to the unauthorized client 202b, either directly from the access management server(s) 204a or indirectly from the access management server(s) 204a to the authorized client 202a and then from the authorized client 202a to the unauthorized client 202b. In some embodiments, selecting the URL or a user interface element corresponding to the URL, may cause a request to be sent to the storage control server(s) 204b that either causes a file 502 to be downloaded immediately to the client that sent the request, or may cause the storage control server 204b to return a webpage to the client that includes a link or other user interface element that can be selected to effect the download.

In some embodiments, a generated token can be used in a similar manner to allow either an authorized client 202a or an unauthorized client 202b to upload a file 502 to a folder corresponding to the token. In some embodiments, for example, an "upload" token can be generated as discussed above when an authorized client 202a is logged in and a designated folder is selected for uploading. Such a selection may, for example, cause a request to be sent to the access management server(s) 204a, and a webpage may be returned, along with the generated token, that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In some embodiments, sending a request including such a token to the storage control server(s) 204b (e.g., by selecting a URL or user-interface element included in an email inviting the user to upload one or more files 502 to the file sharing system 504), a webpage may be returned that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In the described embodiments, the clients 202, servers 204, and appliances 208 and/or 212 (appliances 212 are shown in FIG. 2) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may correspond to respective computing systems, groups of computing systems, or networks of distributed computing systems, such as computing system 300 shown in FIG. 3.

Figure 5B:
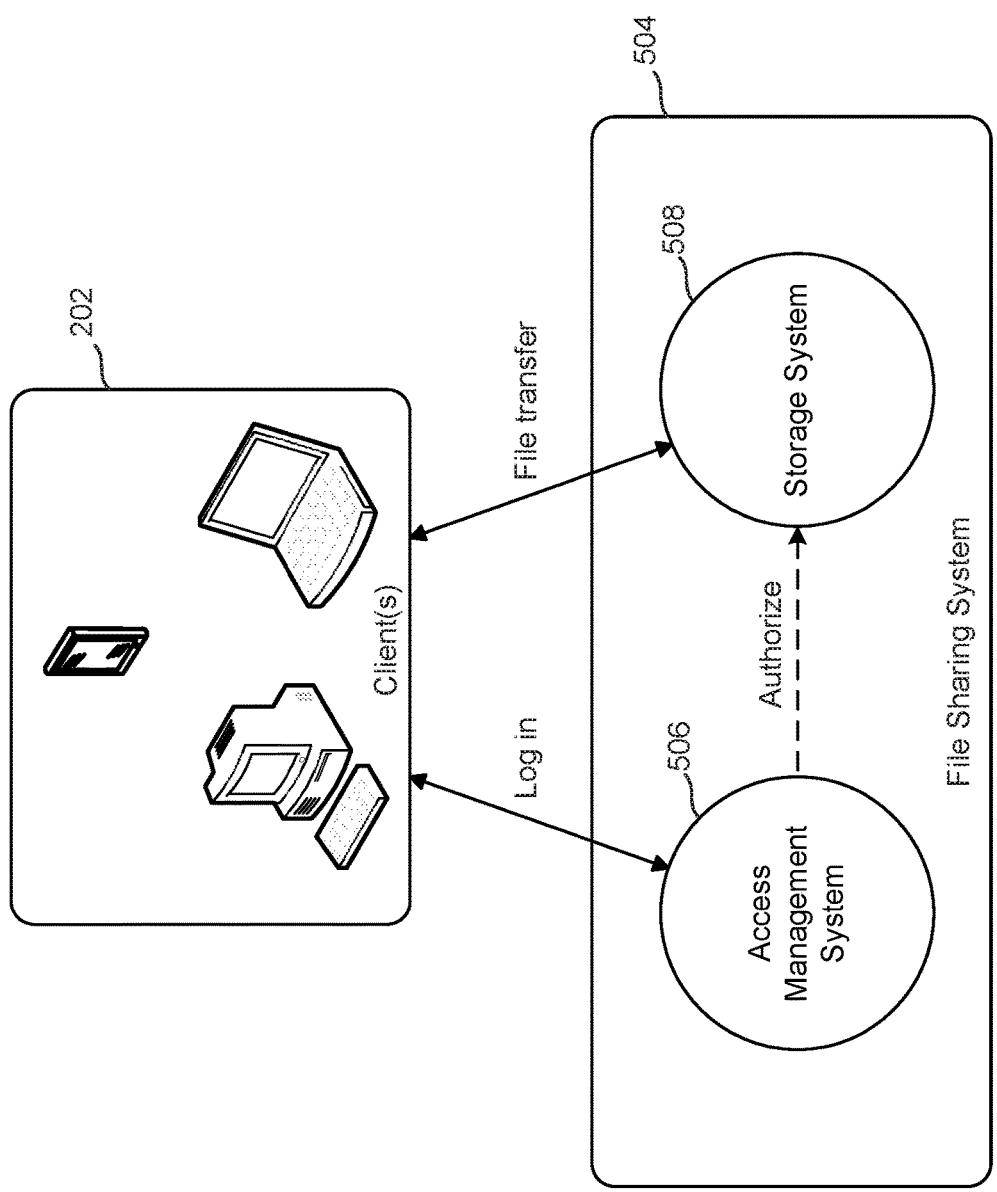
FIG. 5B is a diagram illustrating certain operations that may be performed by the file sharing system shown in FIG. 5A in accordance with some embodiments.

As discussed above in connection with FIG. 5A, in some embodiments, a file sharing system may be distributed between two sub-systems, with one subsystem (e.g., the access management system 506) being responsible for controlling access to files 502 stored in the other subsystem (e.g., the storage system 508). FIG. 5B illustrates conceptually how one or more clients 202 may interact with two such subsystems.

As shown in FIG. 5B, an authorized user operating a client 202, which may take on any of numerous forms, may log in to the access management system 506, for example, by entering a valid user name and password. In some embodiments, the access management system 506 may include one or more webservers that respond to requests from the client 202. The access management system 506 may store metadata concerning the identity and arrangements of files 502 (shown in FIG. 5A) stored by the storage system 508, such as folders maintained by the storage system 508 and any files 502 contained within such folders. In some embodiments, the metadata may also include permission metadata identifying the folders and files 502 that respective users are allowed to access. Once logged in, a user may employ a user-interface mechanism of the client 202 to navigate among folders for which the metadata indicates the user has access permission.

In some embodiments, the logged-in user may select a particular file 502 the user wants to access and/or to which the logged-in user wants a different user of a different client 202 to be able to access. Upon receiving such a selection from a client 202, the access management system 506 may take steps to authorize access to the selected file 502 by the logged-in client 202 and/or the different client 202. In some embodiments, for example, the access management system 506 may interact with the storage system 508 to obtain a unique "download" token which may subsequently be used by a client 202 to retrieve the identified file 502 from the storage system 508. The access management system 506 may, for example, send the download token to the logged-in client 202 and/or a client 202 operated by a different user. In some embodiments, the download token may a single-use token that expires after its first use.

In some embodiments, the storage system 508 may also include one or more webservers and may respond to requests from clients 202. In such embodiments, one or more files 502 may be transferred from the storage system 508 to a client 202 in response to a request that includes the download token. In some embodiments, for example, the download token may be appended to a URL that resolves to an IP address of the webserver(s) of the storage system 508. Access to a given file 502 may thus, for example, be enabled by a "download link" that includes the URL/token. Such a download link may, for example, be sent the logged-in client 202 in the form of a "DOWNLOAD" button or other user-interface element the user can select to effect the transfer of the file 502 from the storage system 508 to the client 202. Alternatively, the download link may be sent to a different client 202 operated by an individual with which the logged-in user desires to share the file 502. For example, in some embodiments, the access management system 506 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 506 and cut-and-paste or otherwise copy the download link into an email or other message the logged in user can then send to the other client 202 to enable the other client 202 to retrieve the file 502 from the storage system 508.

In some embodiments, a logged-in user may select a folder on the file sharing system to which the user wants to transfer one or more files 502 (shown in FIG. 5A) from the logged-in client 202, or to which the logged-in user wants to allow a different user of a different client 202 to transfer one or more files 502. Additionally or alternatively, the logged-in user may identify one or more different users (e.g., by entering their email addresses) the logged-in user wants to be able to access one or more files 502 currently accessible to the logged-in client 202.

Similar to the file downloading process described above, upon receiving such a selection from a client 202, the access management system 506 may take steps to authorize access to the selected folder by the logged-in client 202 and/or the different client 202. In some embodiments, for example, the access management system 506 may interact with the storage system 508 to obtain a unique "upload token" which may subsequently be used by a client 202 to transfer one or more files 502 from the client 202 to the storage system 508. The access management system 506 may, for example, send the upload token to the logged-in client 202 and/or a client 202 operated by a different user.

One or more files 502 may be transferred from a client 202 to the storage system 508 in response to a request that includes the upload token. In some embodiments, for example, the upload token may be appended to a URL that resolves to an IP address of the webserver(s) of the storage system 508. For example, in some embodiments, in response to a logged-in user selecting a folder to which the user desires to transfer one or more files 502 and/or identifying one or more intended recipients of such files 502, the access management system 506 may return a webpage requesting that the user drag-and-drop or otherwise identify the file(s) 502 the user desires to transfer to the selected folder and/or a designated recipient. The returned webpage may also include an "upload link," e.g., in the form of an "UPLOAD" button or other user-interface element that the user can select to effect the transfer of the file(s) 502 from the client 202 to the storage system 508.

In some embodiments, in response to a logged-in user selecting a folder to which the user wants to enable a different client 202 operated by a different user to transfer one or more files 502, the access management system 506 may generate an upload link that may be sent to the different client 202. For example, in some embodiments, the access management system 506 may send an email or other message to the different client 202 that includes a message indicating that the different user has been authorized to transfer one or more files 502 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 502 the different user wishes to upload to the file sharing system 504. The returned webpage may also include a user-interface element, e.g., in the form of an "UPLOAD" button, that the different user can select to effect the transfer of the file(s) 502 from the client 202 to the storage system 508. In other embodiments, the logged-in user may receive the upload link from the access management system 506 and may cut-and-paste or otherwise copy the upload link into an email or other message the logged-in user can then send to the different client 202 to enable the different client to upload one or more files 502 to the storage system 508.

In some embodiments, in response to one or more files 502 being uploaded to a folder, the storage system 508 may send a message to the access management system 506 indicating that the file(s) 502 have been successfully uploaded, and an access management system 506 may, in turn, send an email or other message to one or more users indicating the same. For user's that have accounts with the file sharing system 504, for example, a message may be sent to the account holder that includes a download link that the account holder can select to effect the transfer of the file 502 from the storage system 508 to the client 202 operated by the account holder. Alternatively, the message to the account holder may include a link to a webpage from the access management system 506 inviting the account holder to log in to retrieve the transferred files 502. Likewise, in circumstances in which a logged-in user identifies one or more intended recipients for one or more to-be-uploaded files 502 (e.g., by entering their email addresses), the access management system 506 may send a message including a download link to the designated recipients (e.g., in the manner described above), which such designated recipients can then use to effect the transfer of the file(s) 502 from the storage system 508 to the client(s) 202 operated by those designated recipients.

Figure 5C:
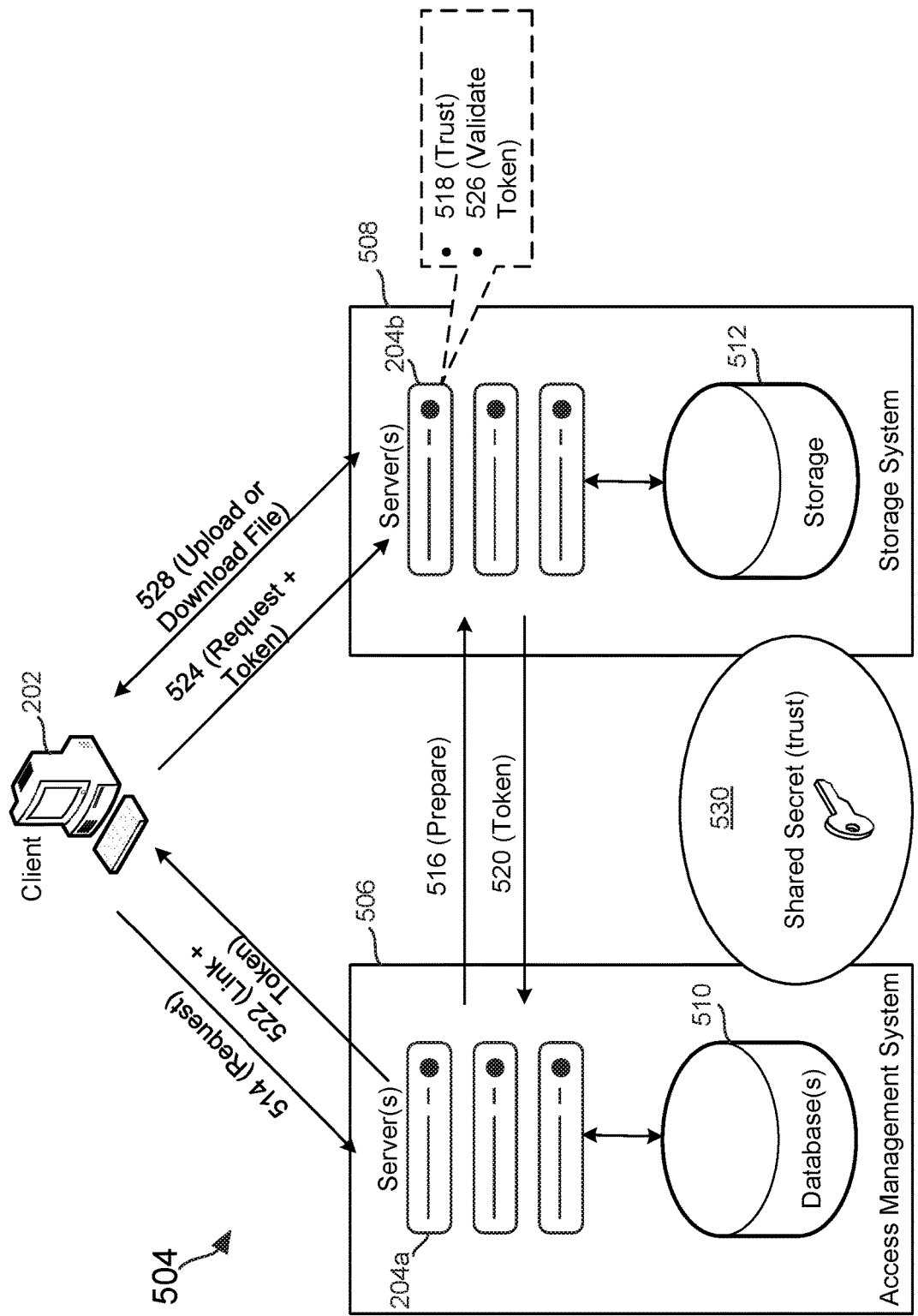
FIG. 5C is a diagram illustrating additional operations that may be performed by the file sharing system shown in FIG. 5A in accordance with some embodiments.

FIG. 5C is a block diagram showing an example of a process for generating access tokens (e.g., the upload tokens and download tokens discussed above) within the file sharing system 504 described in connection with FIGS. 5A and 5B.

As shown, in some embodiments, a logged-in client 202 may initiate the access token generation process by sending an access request 514 to the access management server(s) 204b. As noted above, the access request 514 may, for example, correspond to one or more of (A) a request to enable the downloading of one or more files 502 (shown in FIG. 5A) from the storage system 508 to the logged-in client 202, (B) a request to enable the downloading of one or more files 502 from the storage system 508 to a different client 202 operated by a different user, (C) a request to enable the uploading of one or more files 502 from a logged-in client 202 to a folder on the storage system 508, (D) a request to enable the uploading of one or more files 502 from a different client 202 operated by a different user to a folder of the storage system 508, (E) a request to enable the transfer of one or more files 502, via the storage system 508, from a logged-in client 202 to a different client 202 operated by a different user, or (F) a request to enable the transfer of one or more files 502, via the storage system 508, from a different client 202 operated by a different user to a logged-in client 202.

In response to receiving the access request 514, an access management server 204a may send a "prepare" message 516 to the storage control server(s) 204b of the storage system 508, identifying the type of action indicated in the request, as well as the identity and/or location within the storage medium 512 of any applicable folders and/or files 502. As shown, in some embodiments, a trust relationship may be established (step 518) between the storage control server(s) 204b and the access management server(s) 204a. In some embodiments, for example, the storage control server(s) 204b may establish the trust relationship by validating a hash-based message authentication code (HMAC) based on shared secret or key 530).

After the trust relationship has been established, the storage control server(s) 204b may generate and send (step 520) to the access management server(s) 204a a unique upload token and/or a unique download token, such as those as discussed above.

After the access management server(s) 204a receive a token from the storage control server(s) 204b, the access management server(s) 204a may prepare and send a link 522 including the token to one or more client(s) 202. In some embodiments, for example, the link may contain a fully qualified domain name (FQDN) of the storage control server(s) 204b, together with the token. As discussed above, the link 522 may be sent to the logged-in client 202 and/or to a different client 202 operated by a different user, depending on the operation that was indicated by the request.

The client(s) 202 that receive the token may thereafter send a request 524 (which includes the token) to the storage control server(s) 204b. In response to receiving the request, the storage control server(s) 204b may validate (step 526) the token and, if the validation is successful, the storage control server(s) 204b may interact with the client(s) 202 to effect the transfer (step 528) of the pertinent file(s) 502, as discussed above.

F. Detailed Description of Example Embodiments of a Unified File Storage System

Figure 6:
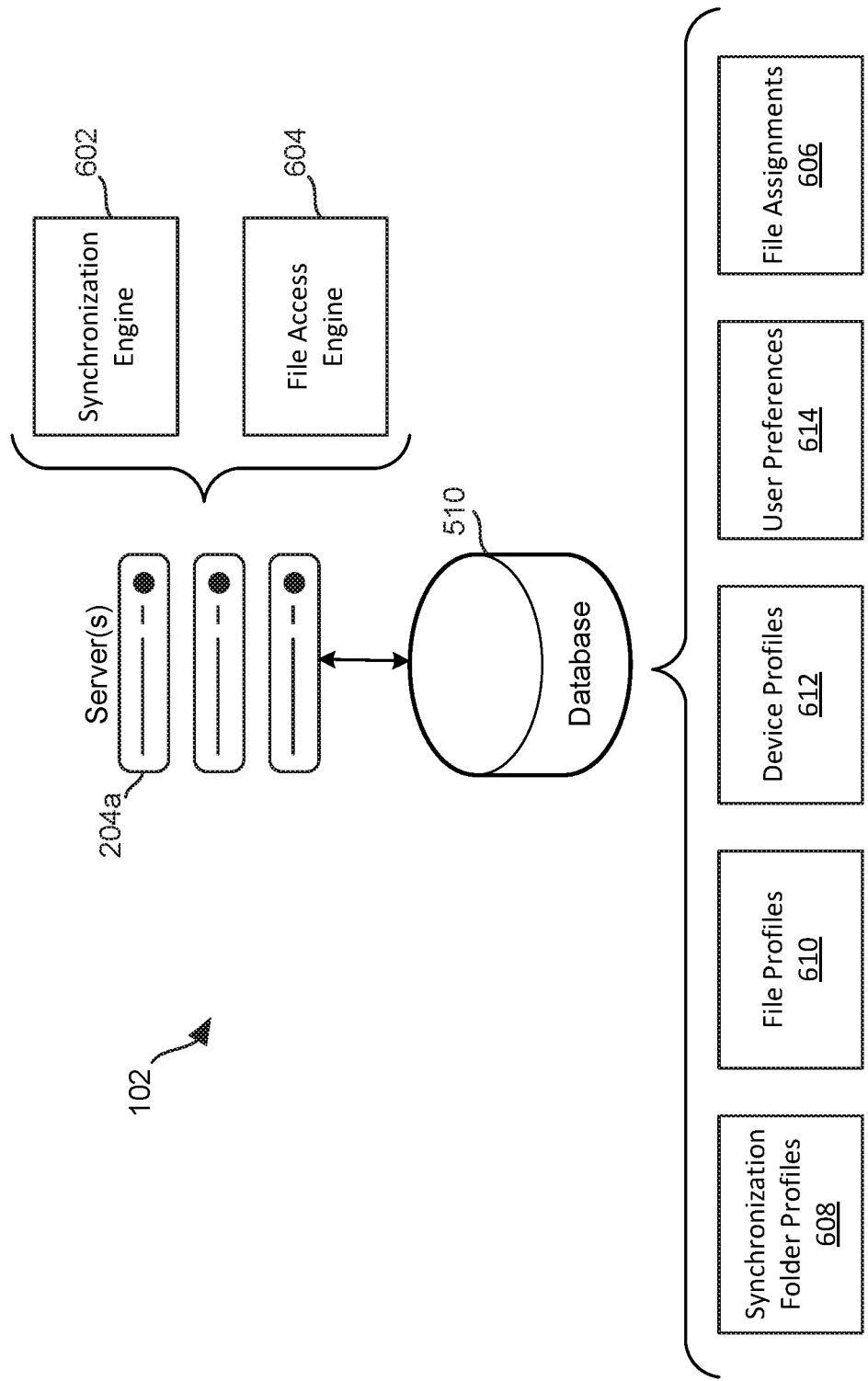
FIG. 6 is block diagram showing additional details of the unified file storage system introduced in connection with FIG. 1.
Figure 7:
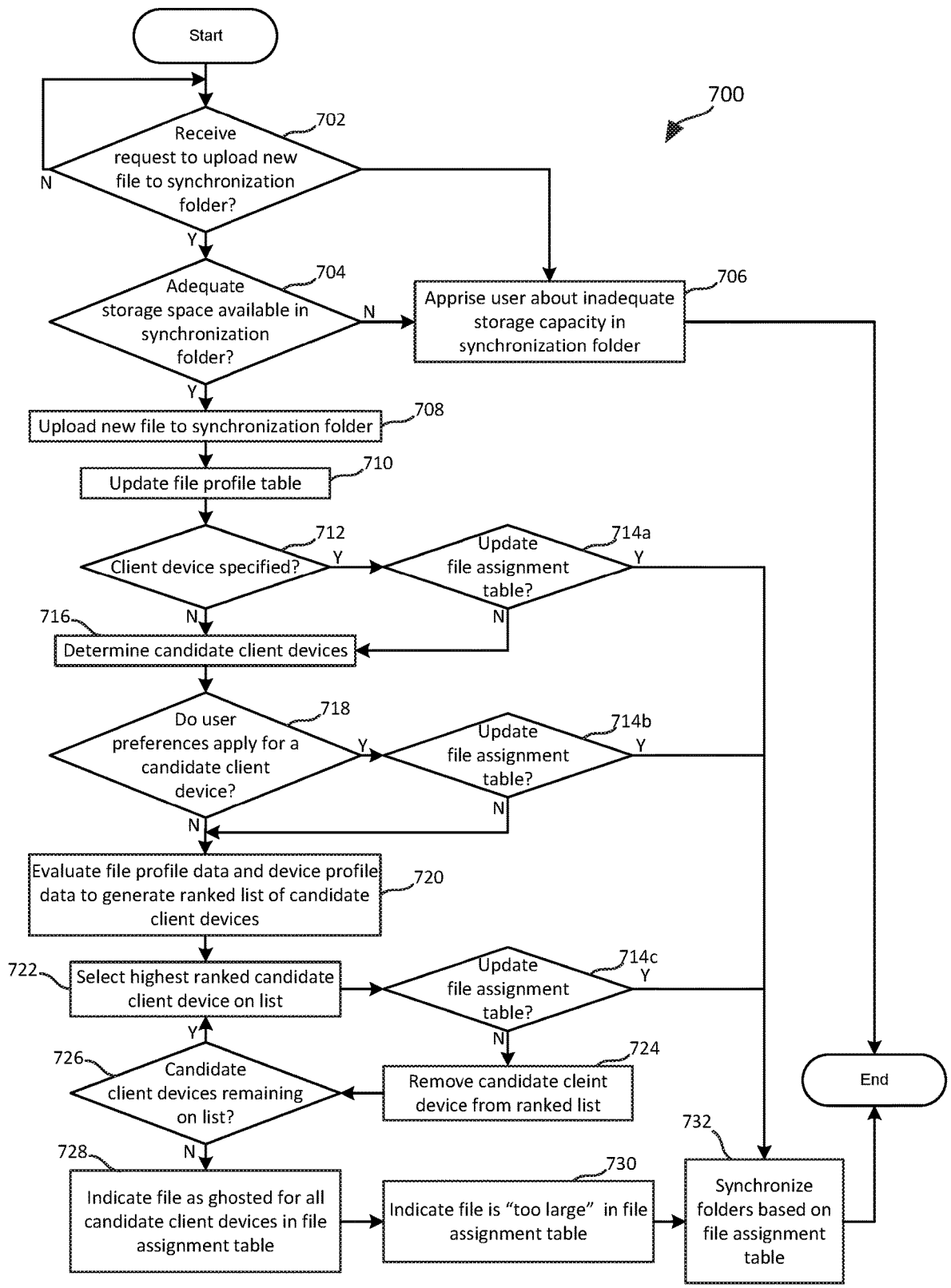
FIG. 7 shows an example routine that may be executed by the synchronization engine shown in FIG. 6.
Figure 8:
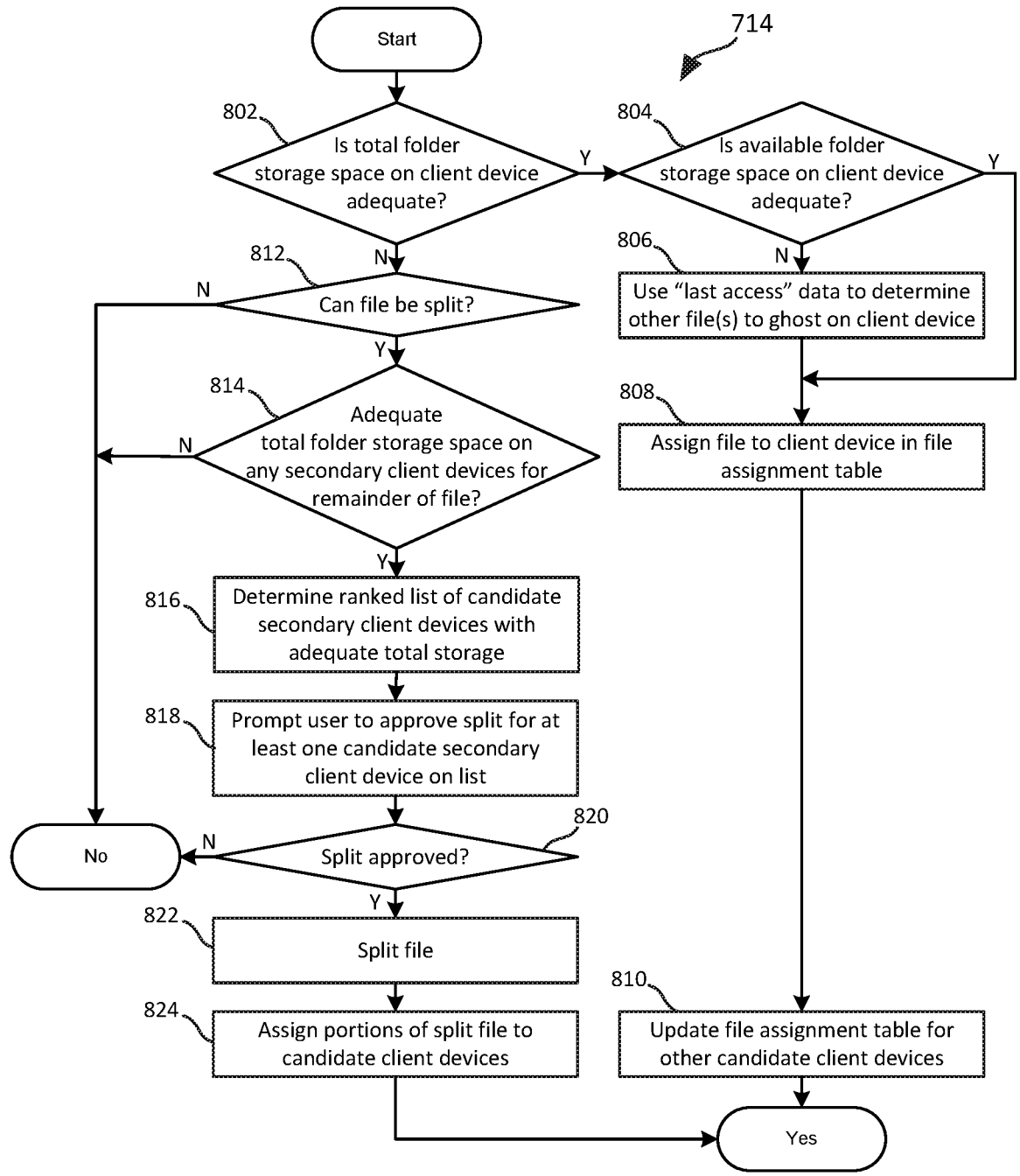
FIG. 8 shows an example implementation of the "update file assignment table?" decision steps/routines that are included in the main routine shown in FIG. 7.
Figure 9A:
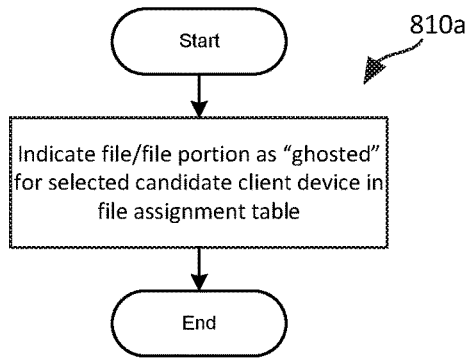
FIG. 9A shows a first alternative implementation of the "update file assignment table for other candidate client devices" step/routine shown in FIG. 8.
Figure 9B:
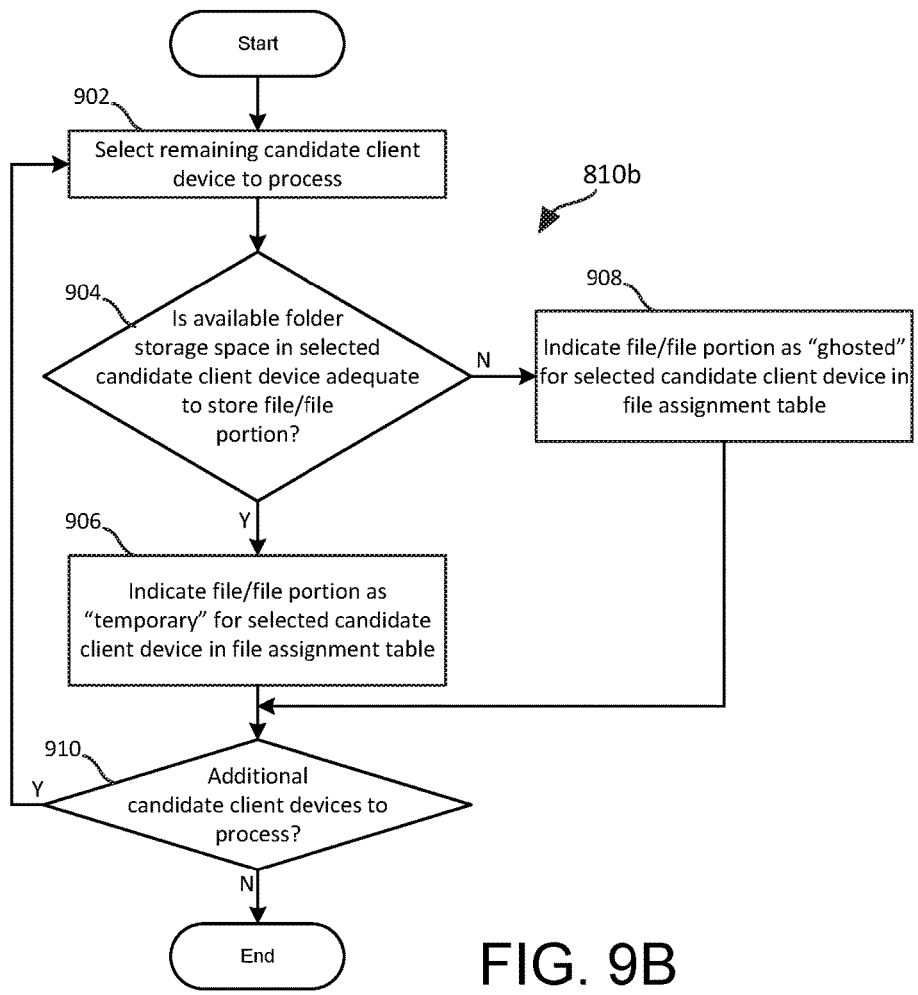
FIG. 9B shows a second alternative implementation of the "update file assignment table for other candidate client devices" step/routine shown in FIG. 8.
Figure 10:
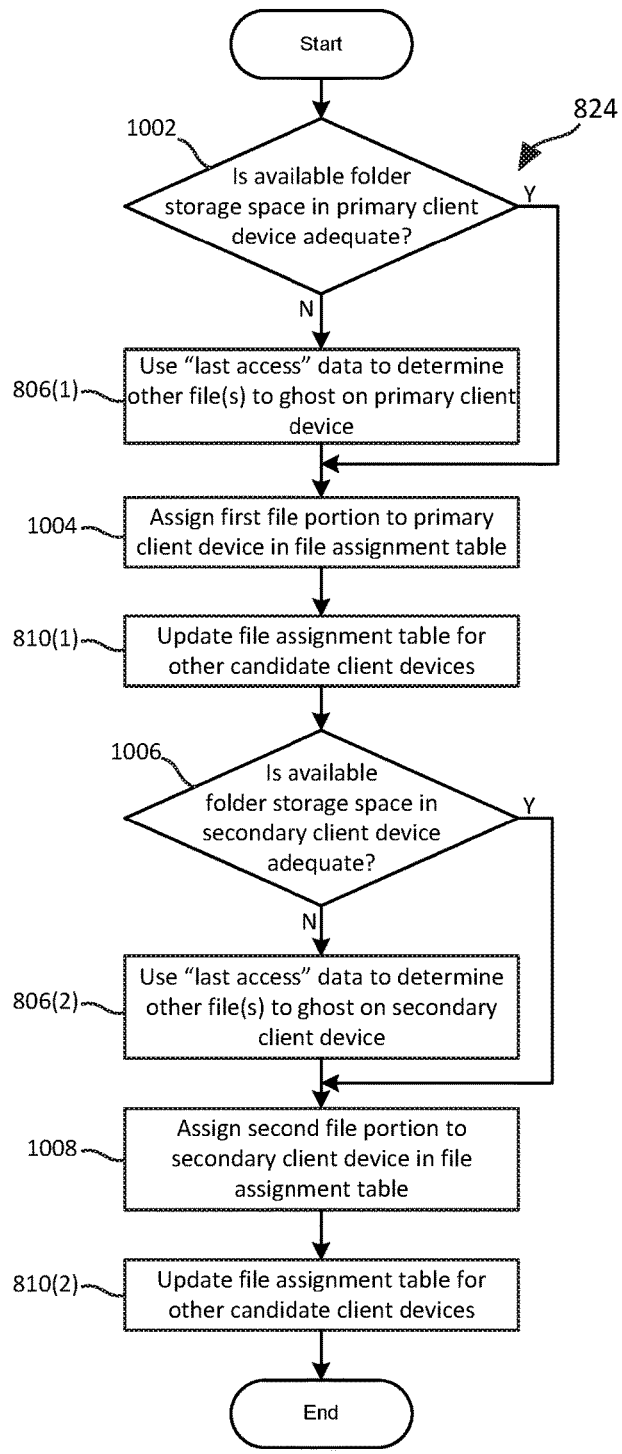
FIG. 10 shows an example implementation of the "assign portions of split file to candidate client devices" step/routine shown in FIG. 8.

FIG. 6 is a block diagram illustrating example components of the unified storage management system 102 that was introduced above in connection with FIG. 1. As shown, in some embodiments, the system 102 may be implements using the access management server(s) 204a and the database(s) 510 of the access management system 506 described above in connection with FIGS. 5A-C. In some implementations, the unified storage management system 102 may include a synchronization engine 602 and a file access engine 604. The synchronization engine 602 may, for example, be embodied by one or more processors and one or more computer-readable media associated with the access management server(s) 204a. In some implementations, the one or more computer-readable media may be encoded with instructions which, when executed by the one or more processors, cause the synchronization engine 602 to perform the routines/steps shown in FIGS. 7-10. In particular, FIG. 7 shows a main routine 700 that may be executed by the synchronization engine 602. FIG. 8 shows an example implementation of decision steps/routines 714a, 714b, 714c that are included in the main routine 700 shown in FIG. 7. FIG. 9A shows a first alternative implementation (designated 810a) of the step/routine 810 shown in FIG. 8. FIG. 9B shows a second alternative implementation (designated 810b) of the step/routine 810 shown in FIG. 8. FIG. 10 shows an example implementation of a step 824 shown in FIG. 8.

As described below, the database(s) 510 may include various types of information that can be used by the synchronization engine 602 to determine, for the respective client devices 108, 202, which files in the synchronization folder 104 are to be downloaded to client-based folders 106 and which files in the synchronization folder 104 are to be ghosted in those folders. In some implementations, the routines/steps shown in FIGS. 7-10 culminate with a folder synchronization process represented by a step 732 in FIG. 7. The step 732 may, for example, correspond to the synchronization process that was introduced above in connection with FIG. 1. The remainder of the routines/steps shown in FIG. 7-10 may involve actions that may be taken to determine and write appropriate data to a "file assignments" table 606. As discussed in more detail below, the table 606 may be referenced during execution of the step 732. Examples of two such "file assignments" tables 606a and 606b are shown in FIGS. 11A and 11B, respectively. As discussed below, the difference between the two tables 606a and 606b is that the table 606b includes "temporary" entries 1102 which may indicate the devices 108 in which newly-uploaded files 110 are to be stored only temporarily, i.e., until room is needed in that device 108 for another file 110 that gets assigned to it.

As shown in FIG. 6, in some implementations, the information that may referenced by the synchronization engine 602 to determine the entries in the "file assignments" table 606 may include a "synchronization folder profiles" table 608, a "file profiles" table 610, a "user preferences" table 612, and a "device profiles" table 614. Example implementations of the tables 608, 610, 612, and 614 are shown in FIGS. 12A, 12B, 12C, and 12D, respectively.

Referring to FIG. 7, the routine 700 may begin at a decision step 702, at which the synchronization engine 602 may await a request to upload a new file 110 to the synchronization folder 104 (see FIG. 1).

When, at the decision step 702, the synchronization engine 602 determines that a file upload request has been received from a client device 202 (with may either be one of the client devices 108 shown in FIG. 1 or another client device 202 operated by a different user), the routine 700 may proceed to a decision step 704, at which the synchronization engine 602 may determine whether there exists adequate storage space for the to-be-uploaded file 110 in the synchronization folder 104. The "synchronization folder profiles" table 608 may be referenced for this purpose. As shown in FIG. 12A, the table 608 may include "folder ID" entries 1202 and "user ID" entries 1204 that correlate the synchronization folders 104 that are maintained by the unified storage management system 102 with respective users. The synchronization folder 104 shown in FIG. 1 may, for example, correspond to "folder 1" in the table 608 shown in FIG. 12A. As shown in FIG. 12A, the table 608 may further include "total storage" entries 1206, which may indicate a total amount of storage space that has been allocated to the respective synchronization folders 104, e.g., within the storage medium 512 (shown in FIGS. 5A and 5C), as well as "available storage" entries 1208, which may indicate the amounts of the "total storage" that has not yet been consumed by files 110 in the respective synchronization folders 104 and is thus available to store additional files 110.

In the illustrated example, assuming "folder 1" corresponds to the synchronization folder 104 shown in FIG. 1, the files 110a, 110b, 110c and 110d consume a total of "17 GB" of storage space, thus leaving "3 GB" of the "20 GB" of total storage space available in the synchronization folder 104.

When, at the decision step 704, the synchronization engine 602 determines that there is not adequate remaining storage space in the synchronization folder 104 for the to-be-uploaded file 110, the routine 700 may proceed to a step 706, at which the synchronization engine 602 may apprise the user who sought to upload the new file 110 about the lack of available storage space. In some implementations, the custodian of the synchronization folder 104 (which may either be the user who sought to upload the file or another individual) may be presented with one or more options for freeing up additional space in the synchronization folder, or perhaps for increasing the amount of "total storage" that is allotted to the synchronization folder 104.

When, at the decision step 704, the synchronization engine 602 determines that there is adequate remaining storage space in the synchronization folder 104 for the to-be-uploaded file 110, the routine 700 may instead proceed to a step 708, at which the synchronization engine 602 may cause the new file 110 to be uploaded to the synchronization folder 104. The synchronization engine 602 may additionally update the "available storage" entry 1208 for the synchronization folder 104 to which the new file 110 was added to account for the storage space that was consumed by the newly-uploaded file 110.

At a step 710, synchronization engine 602 may update the "file profiles" table 610 to reflect the addition of the new file 110 to the synchronization folder 104. In some implementations, for example, an additional row corresponding to the new file 110 may be added to the table 610. As shown in FIG. 12B, the "file profiles" table 610 may include "file ID" entries 1210 and "folder ID" entries 1224 that correlate the files 110 with the synchronization folders 104 in which they are included. The file 110a shown in FIG. 1 may, for example, correspond to "file 1" in the table 610 shown in FIG. 12B.

As mentioned above, in some implementations, the user who uploads a file to a synchronization folder 104 may be given the ability to specify one or more particular client devices 108, 202 to which the newly-uploaded file 110 is to be assigned. In some implementations, for example, when a user seeks to upload a new file 110 to a synchronization folder 104, the synchronization engine 602 may reference the "device profiles" table 614 (described below) to identify the client devices 108, 202 that are associated with the user with whom that synchronization folder 104 corresponds. The synchronization engine 602 may, for example, cause a client device 202 operated by the user uploading the file 110 to present a user interface that includes a mechanism for indicating that the file 110 is to be assigned to a selected one of more of the identified client devices 108, 202. If one or more particular client devices 108, 202 are selected, "client device ID" entries 1212 identifying such devices may be written to the "file profiles" table 610. In the example shown in FIG. 12B, for instance, the "client device ID" entries 1212 indicate that a user specified that "file 3" was to be assigned to the client device 108, 202 associated with the device identifier "D1."

In some implementations, the synchronization engine 602 may determine the remaining fields, i.e., "file type" entries 1214, "file purpose" entries 1216, "content category" entries 1218, "file size" entries 1220, and "last access" entries" 1224, by examining various features of the newly-uploaded file 110. For example, in some implementations, the "file type" entries 1214, the "file size" entries 1220 and/or the "last access" entries 1224 may be determined be examining the title, header and/or other metadata associated with the file 110. In implementations in which the synchronization engine 602 is implemented within the access management system 506 (shown in FIGS. 5A-C), e.g., using the access management server(s) 204a, the synchronization engine 602 may rely upon the storage control server(s) 204*b* of the storage system 508 (where the new file would actually be stored) to determine some or all of this information. In some implementations, the "file type" indicators (e.g., "audio," "video," "image," "email," "executable," "presentation," "programming," "spreadsheet," "word processor," or the like) for the "file type" entries 1214 may be determined based on the extensions that are appended to the file names, e.g., "mp4," "jpg," "pptx," "docx," "pdf," etc.

In some implementations, the synchronization engine 602 may determine the "file purpose" entries 1216 and/or the "content category" entries 1218 by evaluating the header and/or payload of the newly-uploaded file 110. In implementations in which the synchronization engine 602 is implemented within the access management system 506 (shown in FIGS. 5A-C), e.g., using the access management server(s) 204*a*, the synchronization engine 602 may rely upon the storage control server(s) 204*b* of the storage system 508 (where the new file would actually be stored) to perform such an evaluation. For example, in some implementations, the storage control server(s) 204*b* may look for one or more keywords or phrases in the header and/or payload that are indicative of a particular purpose (e.g., "personal" versus "work") or a particular category of content (e.g., "entertainment," "financial," "technical," educational," etc.).

In some implementations, one or more the entries 1214, 1216, 1218, 1220, and 1224, may alternatively be determined based on user input. For example, in some implementations, when a user seeks to upload a new file 110 to a synchronization folder 104, the synchronization engine 602 may prompt the user to identify (e.g., using checkboxes) various features of the file 110 being uploaded. The synchronization engine 602 may then write such selections to the "file profiles" table 610.

At a decision step 712 of the routine 700 (shown in FIG. 7), the synchronization engine 602 may determine whether a user has specified that the newly-uploaded file 110 is to be assigned to a particular client device 108, 202. Such a determination may be made, for example, by determining whether the "file profiles" table 610 (shown in FIG. 12B) has a "client device ID" entry 1212 associated with the newly-uploaded file 110.

When, at the decision step 712, the synchronization engine 602 determines that a user has specified that the newly-uploaded file 110 is to be assigned to a particular client device 108, 202, the routine 700 may proceed to a decision step 714*a*, at which the synchronization engine 602 may determine whether and how to update the "file assignments" table 606 for that file 110. An example implementation of the decision step/routine 714*a* is described below in connection with FIG. 8. As described below in connection with FIG. 8, the determination made at the decisions step/routine 714*a* may involve determining whether it is possible to assign the file 110 to the specified candidate client device 108, 202, or to split the file 110 and assign respective portions to the specified candidate client device 108, 202 and another one of the candidate client devices 108, 202 identified at the step 716.

When, at the decision/step routine 714*a*, the synchronization engine 602 determines to update the "file assignments" table 606 for the newly-uploaded file 110, the routine 700 may proceed to the step 732, at which the synchronization engine 602 may effect partial synchronizations with the client-based folders 106 that are associated with the synchronization folder 104 to which the new file 110 was added, in accordance with the entries in the "file assignments" table 606. For example, in a circumstance in which a synchronization folder 104 is to be partially synchronized with three client-based folders 106*a*, 106*b*, 106*c*, such as in the environment depicted in FIG. 1, "download" entries 1104 and "ghost" entries 1106 in "file assignments" table 606*a* (shown in FIG. 11A) may indicate that, as a result of the synchronization step 732, "file 1" is to be downloaded to device "D1" but is to be only ghosted on devices "D2" and "D3."

With respect to the "file assignments" table 606*b* (shown in FIG. 11B), the "download" entries 1104 similarly indicate that "file 1" is to be downloaded to the device "D1" as a result of the synchronization step 732. As noted above, however, in addition to "download" entries 1104 and "ghost" entries 1106, the "file assignments" table 606*b* includes "temporary" entries 1102, which identify devices to which files 110 are to be downloaded for local access on a temporary basis, e.g., until storage space is needed to accommodate another file 110 that gets assigned, via a "download" entry 1104, to that same device. For example, the "temporary" entries 1102 in the "file assignments" table 606*b* may indicate that "file 1" is to be downloaded to device "D2" on a temporary basis, and the "ghost" entries 1106 in the "file assignments" table 606*b* may indicate that "file 1" is to be ghosted on the device "D3." As explained below in connection with the step 806 of the decision step/routine 714 (shown in FIG. 8), in some implementations, the files 110 that are assigned to the devices 108, 202 on a "temporary" basis may be evicted from the client-based folders 106 to make room for other files 110 that are subsequently assigned to such client-based folders 106 by moving a device identifier, e.g., "D2" in FIG. 11B, from the "temporary" column to the "ghost" column for that file 110.

When, at the decision step/routine 714*a* of the routine 700 (shown in FIG. 7), the synchronization engine 602 determines not to update the "file assignments" table 606 for the newly-uploaded file 110, the routine 700 may instead proceed to a step 716, at which a set of candidate client devices 108, 202 to which the file 110 may potentially be assigned may be determined. Such a list of candidate client devices 108, 202 may be determined, for example, by identifying "device ID" entries 1234 that are associated with a "user ID" entry 1236 corresponding to the user for whom the "file assignments" table 606 is being populated. In the example shown in FIG. 12D, for instance, the device identifiers "D1," "D2," "D3," and "D4" are associated with the user identifier "U1." As shown in FIG. 12D, in addition to correlating candidate client devices 108, 202 with users, the "device profiles" table 614 may, in some implementations, include "total storage" entries 1238, "available storage" entries 1240, "device type" entries 1242, "device purpose" entries 1244, "% usage" entries 1246, and "available bandwidth" entries 1248.

The "total storage" entries 1238 in the table 614 may indicate the total amount of storage space that has been allocated to the respective client-based folders 106 within the client devices 108, 202. The "available storage" entries 1240 may indicate the amounts of the "total storage" (per the entries 1238) that has not yet been consumed by files 110 in the respective client-based folders 106 and is thus available to store additional files 110. The "device type" entries 1242 and the "device purpose" entries may, for example, be set by the user, a system administrator, or otherwise. The "% usage" entries 1246 may, for example, represent a determined percentage of the time that a user has historically operated the indicated client device 108, 202 as compared to the other client device 108, 202 that are associated with the same user in the table 614. The "available bandwidth"

entries 1248 may, for example, represent the available bandwidth, e.g., in megabytes-per-second (Mbps), of the current connection, if any, between the indicated client device 108, 202 and the storage control server(s) 204*b* of the file sharing system 504 (shown in FIGS. 5A and 5C). As such, the "available bandwidth" entries 1248 may indicate the relative speeds at which files 110 could be downloaded from the storage system 508 to the respective client devices 108, 202.

At a step 718, the synchronization engine 602 may determine whether entries in the "user preferences" table 612 indicate that the newly-uploaded file 110 is to be assigned to a particular client device 108, 202. As shown in FIG. 12C, in some implementations, the "user preferences" table 612 may include "file type" entries 1224, "file purpose" entries 1226, "content category" entries 1228, and "file size" entries 1230 that correspond to similarly named entries 1214, 1216, 1218, and 1220 in the "file profiles" table 610. In some implementations, the synchronization engine 602 may determine whether the entries 1214, 1216, 1218, and 1220 for the newly-uploaded file 110 in the "file profiles" table 610 match the criteria indicated by the preference entries 1224, 1226, 1228, and 1230 of the user for whom the "file assignments" table 606 is being populated. In the example shown in FIG. 12C, for instance, the first row of the "user preferences" table 612 indicates that, for user "U1," all "personal" files are to be assigned to the device "D3." In some implementations, a mechanism may be provided that allows users to adjust their preference settings in the "user preferences" table 612 in such a way that the various preference settings do not conflict with one another.

When, at the decision step/routine 718 of the routine 700 (shown in FIG. 7), the synchronization engine 602 determines that entries in the "user preferences" table 612 indicate that the newly-uploaded file 110 is to be assigned to a particular client device 108, 202, the routine 700 may proceed to the decision step/routine 714*b*, at which the synchronization engine 602 may determine whether and how to update the "file assignments" table 606 for that file 110. As described below in connection with FIG. 8, that determination may involve determining whether it is possible to assign the file 110 to the candidate client device 108, 202 indicated by the "user preferences" table 612, or to split the file 110 and assign respective portions to the candidate client device 108, 202 indicated by the "user preferences" table 612 and another one of the candidate client devices 108, 202 identified at the step 716.

When, at the decision/step routine 714*b*, the synchronization engine 602 determines to update the "file assignments" table 606 for the newly-uploaded file 110, the routine 700 may proceed to the step 732, at which (as discussed above) the synchronization engine 602 may effect partial synchronizations with the various client-based folders 106 that are associated with the synchronization folder 104 to which the new file 110 was added, in accordance with the entries in the "file assignments" table 606.

When, at the decision step/routine 714*b* of the routine 700 (shown in FIG. 7), the synchronization engine 602 determines not to update the "file assignments" table 606 for the newly-uploaded file 110, the routine 700 may instead proceed to a step 720, at which the synchronization engine 602 may evaluate data in the "file profiles" table 610 together with data in the "device profiles" table 614 to generate a ranked list of the candidate client devices 108, 202 that were identified at the step 716. In some implementations, a trained machine learning model may be used for that purpose. For example, as illustrated in FIG. 13, in some implementations, a trained machine learning model 1300 may be used to determine a device ranking score 1314 for each of the candidate client devices 108, 202 that was identified at the step 716, and the ranked list of candidate client devices 108, 202 may be generated based on such device ranking scores 1314.

Figure 13:
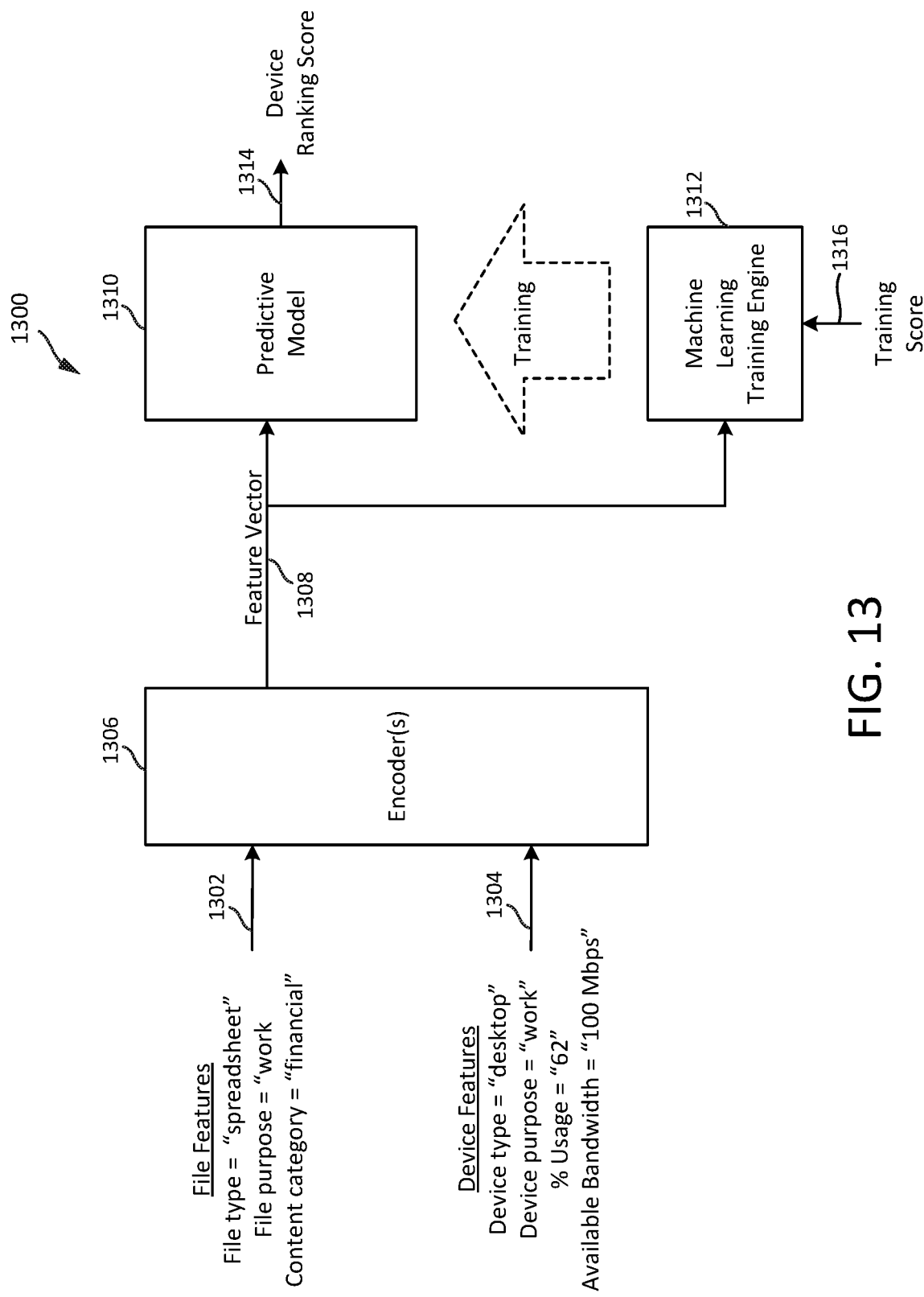
FIG. 13 shows an example implementation of a machine learning model that may be employed by the synchronization engine shown in FIG. 6.

As shown in FIG. 13, the values of certain features 1302 of the newly-uploaded file 110 (e.g., corresponding to values in the "file profiles" table 610 (shown in FIG. 12B) that were added per the step 710—discussed above), as well as the values of certain features 1304 of one of the candidate client devices 108, 202 determined at the step 716 (e.g., corresponding to values in the "device profiles" table 614 (shown in FIG. 12D) for that candidate client device 108, 202), may be provided to one or more encoders 1306. As illustrated, the encoder(s) 1306 may encode the values of the input features 1302, 1304 into a feature vector 1308 which may be fed to a predictive model 1310.

In some implementations, the predictive model 1310 may comprise a multi-classification model that may be trained, e.g., using a machine learning algorithm executed by a machine learning training engine 1312, to classify the received feature vector 1308 into one of a number of possible categories, which each such category corresponding to a possible device ranking score 1314. For example, in some implementations, such a multi-classification model may classify each received feature vector 1308 into one of one hundred categories, with each such category representing a respective device ranking score between one and one hundred.

As shown in FIG. 13, the predictive model 1310 may be trained or re-trained by providing feature vectors 1308 and corresponding training scores 1316 to the machine learning training engine 1312 and causing the machine learning training engine 1312 to execute its machine learning algorithm using that data. In some implementations, the predictive model 1310 may be initially trained using a collected data set that includes feature vectors 1308 (or the parameters 1302, 1304 used to generate such feature vectors 1308) that have been tagged with corresponding training scores 1316.

Further, in some implementations, the feature vectors 1308 (or the parameters 1302, 1304 used to generate such feature vectors 1308) that are used to generate device ranking scores 1314 for respective candidate client devices 108, 202 may be recorded, e.g., in the database(s) 510, together with the determined device ranking scores 1314 for those feature vectors 1308 (or parameters 1302, 1304), and that recorded data may subsequently be used to retrain the predictive model 1310. For example, in some implementations, a user's subsequent attempts to access the file 110 using a client device 108, 202 other than that to which the file 110 was assigned may be monitored, and, in at least some circumstances, the synchronization engine 602 may adjust the device ranking scores 1314 that were assigned to the previously-recorded feature vectors 1308 (or parameters 1302, 1304), e.g., using a formula, algorithm, etc., and such adjusted device ranking scores 1314 may then be used as a training score 1316 that may be fed to the machine learning training engine 1312 together with the corresponding recorded feature vector 1308 (or parameters 1302, 1304) so as to retrain the predictive model 1310.

At a step 722 of the routine 700 (shown in FIG. 7), the synchronization engine 602 may select the highest ranked candidate client device 108, 202 from the ranked list generated at the step 720.

At a decision step/routine 714*c*, the synchronization engine 602 may determine whether and how to update the "file assignments" table 606 for the highest ranked file 110 selected at the step 722. As described below in connection with FIG. 8, that determination may involve determining whether it is possible to assign the file 110 to the candidate client device 108, 202 selected at the step 722, or to split the file 110 and assign respective portions to the candidate client device 108, 202 selected at the step 722 and another one of the candidate client devices 108, 202 identified at the step 716.

When, at the decision/step routine 714c, the synchronization engine 602 determines to update the "file assignments" table 606 for the newly-uploaded file 110, the routine 700 may proceed to the step 732, at which (as discussed above) the synchronization engine 602 may effect partial synchronizations with the various client-based folders 106 that are associated with the synchronization folder 104 to which the new file 110 was added, in accordance with the entries in the "file assignments" table 606.

When, at the decision step/routine 714c of the routine 700 (shown in FIG. 7), the synchronization engine 602 determines not to update the "file assignments" table 606 for the newly-uploaded file 110, the routine 700 may instead proceed to a step 724, at which the synchronization engine 602 may remove the candidate client device 108, 202 selected at the step 722 from the list that was generated at the step 720.

At a decision step 726, the synchronization engine 602 may determine whether any candidate client devices 108, 202 are still indicated on the list. When, at the decision step 726, the synchronization engine 602 determines that there is at least one candidate client device 108, 202 remaining on the list, the routine 700 may return to the step 722, at which the highest ranked candidate client device 108, 202 remaining on the list may be selected for evaluation pursuant to the decision step 714c.

When, at the decision step 726, the synchronization engine 602 determines that there are no more candidate client devices 108, 202 indicated on the list, the routine 700 may instead proceed to a step 728, at which the synchronization engine 602 may update the "file assignments" table 606 to indicate that the newly-uploaded file 110 is to be ghosted on all of the candidate client devices 108, 202 that were identified at the step 716. Further, as illustrated in FIGS. 11A and 11B, in some implementations, a particular "download" entry 1104 may be added to the "file assignments" table 606 to indicate that the file 110 is too large to download to the client-based folder 106 of any of the candidate client devices 108, 202. Such an indicator may be used, for example, to apprise the user that the newly-uploaded file 110 cannot be automatically downloaded to any of the user's devices by the synchronization step 732, thus enabling the user to take remedial action, such as by increasing the amount of memory that is allocated to a client-based folder 106 on one or more of the client devices 108, 202.

An example implementation of the decision steps/routines 714a, 714b, 714c (collectively, "routine 714") shown in FIG. 7 will now be described with reference to FIG. 8. As shown in FIG. 8, the routine 714 may begin at a decision step 802, at which the synchronization engine 602 may determine whether the total storage space in the client-based folder 106 on the candidate client device 108, 202 is adequate to store the newly-uploaded file 110. That determination may be made, for example, by comparing the value of the "file size" entry 1220 for the newly-uploaded file 110 in the "file profiles" table 610 (shown in FIG. 12B) with the value of the "total storage" entry 1238 for the candidate client device 108, 202 in the "device profile" table 614 (shown in FIG. 12D).

When, at the decision step 802, the synchronization engine 602 determines that there is adequate total storage space for the newly-uploaded file 110 in the client-based folder 106 of the candidate client device 108, 202, the routine 714 may proceed to a decision step 804, at which the synchronization engine 602 may determine whether the available storage space in the client-based folder 106 on the candidate client device 108, 202 is adequate to store the newly-uploaded file 110. That determination may be made, for example, by comparing the value of the "file size" entry 1220 for the newly-uploaded file 110 in the "file profiles" table 610 (shown in FIG. 12B) with the value of the "available storage" entry 1240 for the candidate client device 108, 202 in the "device profile" table 614 (shown in FIG. 12D).

When, at the decision step 804, the synchronization engine 602 determines that there is not adequate available storage space for the newly-uploaded file 110 in the client-based folder 106 of the candidate client device 108, 202, the routine 714 may proceed to the step 806, at which the synchronization engine 602 may select one or more other files 110 (which were previously assigned to the client-based folder 106) that are to be "evicted" from the client-based folder 106 to make room for the newly-uploaded file 110. In some implementations, for example, the synchronization engine 602 may mark for eviction one or more of the least recently used files 110 that are currently assigned to the client device 108, 202. The synchronization engine 602 may, for example, determine the times at which the respective files 110 were most recently used by referencing the "last access" entries 1224 in the "file profiles" table 610 (shown in FIG. 12B). In some implementations, a file 110 may be evicted from a client-based folder 106 by moving a device identifier for the client device 108, 202 that includes that client-based folder 106 from the "download" column to the "ghost" column in the "file assignments" table 606 for that file 110.

Although not shown in FIG. 8, it should be appreciated that, in some implementations, the new file 110 may instead be ghosted in the client-based folder 106 in at least some circumstances, such as when the time that has elapsed since when the newly-uploaded file 110 was last accessed is greater than a threshold period. In some implementations, the determination of whether to evict a particular file 110 from a given client device 108, 202 may additionally or alternatively depend on whether that file 110 is present on another client device 108, 202 that the given client device 108, 202 is able to access via a local area network (LAN).

Further, in implementations that allow files 110 to be temporarily assigned to client-based folders 106, the synchronization engine 602 may initially select one or more temporarily assigned files 110 for eviction to make room for the newly-uploaded file 110. In some implementations, for example, the synchronization engine 602 may mark for eviction one or more of the least recently used files 110 that are temporarily assigned to the client device 108, 202. In some implementations, a temporarily assigned file 110 may be evicted from a client-based folder 106 by moving a device identifier for the client device 108, 202 that includes the client-based folder 106 from the "temporary" column to the "ghost" column in the "file assignments" table 606 for that file 110. In some such implementations, a previously-assigned file 110 may be evicted from a client-based folder 106 only if sufficient storage space cannot be freed up by evicting temporarily assigned files 110.

When, at the decision step 804, the synchronization engine 602 determines that there is adequate available storage space for the newly-uploaded file 110 in the client-based folder 106 of the candidate client device 108, 202, the routine 714 may instead proceed to a step 808, at which the synchronization engine 602 may assign the newly-uploaded file 110 to the candidate client device 108, 202 under consideration. As indicated previously, such an assignment can be made by adding a device identifier for the candidate client device 108, 202 to the "download" column for the newly-uploaded file 110 in the "file assignments" table 606.

At a step/routine 810, the synchronization engine 602 may update the "file assignments" table 606 for the other candidate client devices 108, 202 that were identified at the step 716 of the routine 700 (shown in FIG. 7). FIGS. 9A and 9B show two alternative implementations of the step/routine 810. The first alternative (designated as a step 810a in in FIG. 9A) may be applicable in an implementation in which files 110 are not permitted to be temporarily assigned to candidate client devices 108, 202. The second alternative (designated as a routine 810b in FIG. 9B) may be applicable in an implementation in which files 110 can be temporarily assigned to candidate client devices 108, 202.

As shown in FIG. 9A, in an implementation in which files 110 are not permitted to be temporarily assigned to candidate client devices 108, 202, the step 810a may involve simply indicating the newly-uploaded file 110 as ghosted for the other candidate client devices 108, 202. That may be accomplished, for example, by adding device identifiers for the other candidate client devices 108, 202 in the "ghost" column for the newly-uploaded file 110 in the "file assignments" table 606a (shown in FIG. 11A).

As shown in FIG. 9B, in an implementation in which files 110 can be temporarily assigned to candidate client devices 108, 202, the synchronization engine 602 may cycle through the other candidate client devices 108, 202 (per steps 902 and 910), and, for each such client device 108, 202, may make a determination (at a decision step 904) whether there is adequate available storage space in the client-based folder 106 of the candidate client device 108, 202 to store the newly-uploaded file 110.

When, at the decision step 904, the synchronization engine 602 determines that there is adequate available storage space for the newly-uploaded file 110 in the client-based folder 106 of the other candidate client device 108, 202 selected at the step 902, the routine 810b may proceed to a step 906, at which the synchronization engine 602 may temporarily assign the newly-uploaded file 110 to the selected candidate client device 108, 202. That may be accomplished, for example, by adding a device identifier for the selected candidate client device 108, 202 to the "temporary" column for the newly-uploaded file 110 in the "file assignments" table 606b (shown in FIG. 11B).

When, at the decision step 904, the synchronization engine 602 determines that there is not adequate available storage space for the newly-uploaded file 110 in the client-based folder 106 of the other candidate client device 108, 202 selected at the step 902, the routine 810b may instead proceed to a step 908, at which the synchronization engine 602 may indicate the newly-uploaded file 110 as ghosted for the selected candidate client device 108, 202. That may be accomplished, for example, by adding a device identifier for the candidate client device 108, 202 under consideration in the "ghost" column for the newly-uploaded file 110 in the "file assignments" table 606b (shown in FIG. 11B).

Referring again to FIG. 8, when (at the decision step 802) the synchronization engine 602 determines that there is not adequate total storage space for the newly-uploaded file 110 in the client-based folder 106 of the candidate client device 108, 202 under consideration, the routine 714 may proceed to a decision step 812, at which the synchronization engine 602 may determine whether the newly-uploaded file 110 is capable of being split into multiple parts. In some implementations, for example, data may be stored in the "file profiles" table 610 (shown in FIG. 12B) that indicates whether the respective files 110 are "divisible." For instance, in some implementations, video files and zipped files may be indicated as divisible.

When, at the decision step 812, the synchronization engine 602 determines that the newly-uploaded file 110 is not divisible, the routine 714 may complete via a "no" path, with the synchronization engine 602 determining not to update the "file assignments" table 606 with respect to the candidate client device 108, 202 under consideration.

When, at the decision step 812, the synchronization engine 602 determines that the newly-uploaded file 110 can be split into multiple parts, e.g., by unzipping a zipped file, the routine 714 may proceed to a decision step 814, at which the synchronization engine 602 may determine whether the client-based folders 106 of any of the other candidate client devices 108, 202 has enough total storage space to store the portion of the newly-uploaded file 110, after it is split into multiple parts, that cannot be stored in the client-based folder 106 of the primary client device 108, 202 under consideration. That determination may be made, for example, by comparing the size of the remaining portion of newly-uploaded file 110 with the values of the "total storage" entries 1238 for the other client devices 108, 202 in the "device profile" table 614 (shown in FIG. 12D).

When, at the decision step 814, the synchronization engine 602 determines that no other client-based folder 106 has enough total storage space to store the remaining portion of the file 110, the routine 714 may complete via a "no" path, with the synchronization engine 602 determining not to update the "file assignments" table 606 with respect to the candidate client device 108, 202 under consideration.

When, at the decision step 814, the synchronization engine 602 determines that at least one other client-based folder 106 has enough total storage space to store the remaining portion of the file 110, the routine 714 may instead proceed to a step 816, at which the synchronization engine 602 may determine a ranked list of the secondary candidate client devices 108, 202 with enough total storage space to store the remaining portion. In some implementations, the step 816 may be performed using a trained machine learning model, similar to that described above in connection with FIG. 13. Further, in addition to or in lieu of the device features 1304 discussed above in connection with FIG. 13, information concerning the geographic locations and/or available radio technologies (e.g., Bluetooth, WiFi direct, etc.) of the respective candidate client devices identified at the step 716 map be provided to the encoder(s) 1306, so that such information may be considered by the predictive model 1310 when determining the ranked list of the secondary client devices 108, 202. The use of such information may be advantageous, for example, when a user desires stream a secondary portion of a split file from a secondary client device (e.g., a laptop) to a primary client device (e.g., a mobile phone), so as to be able to access the entirety of the file 110 (e.g., to watch an entire video) using the primary client device 108, 202, or simply so that both portions of the split file 110 may be accessed at approximately the same time from approximately the same geographic location, e.g., if the user has both a laptop and a mobile device at an airport or the like.

At a step 818, the synchronization engine 602 may prompt the user for whom the "file assignments" table 606 is being populated to approve the splitting of the newly-uploaded file 110 between multiple client devices 108, 202.

At a decision step 820, the synchronization engine 602 may determine whether the user has authorized the newly-uploaded file 110 to be split between multiple client devices 108, 202.

When, at the decision step 820, the synchronization engine 602 determines that the user has not authorized the newly-uploaded file 110 to be split between multiple client devices 108, 202, the routine 714 may complete via a "no" path, with the synchronization engine 602 determining not to update the "file assignments" table 606 with respect to the candidate client device 108, 202 under consideration.

When, at the decision step 820, the synchronization engine 602 determines that the user has authorized the newly-uploaded file 110 to be split between multiple client devices 108, 202, the routine 714 may instead proceed to a step/routine 822, pursuant to which the synchronization engine 602 may separate the file 110 into multiple parts.

At a step/routine 824, the synchronization engine 602 may assign the portions of the split file to different candidate client devices 108, 202 and the "file assignments" table 606 may be updated accordingly. An example implementation of the step routine 824 is shown in FIG. 10.

As shown in FIG. 10, at a decision step 1002 of the routine 824, the synchronization engine 602 may determine whether the available storage space in the client-based folder 106 on the primary candidate client device 108, 202 is adequate to store a first portion of the newly-uploaded file 110.

When, at the decision step 1002, the synchronization engine 602 determines that there is not adequate available storage space for the first portion of newly-uploaded file 110 in the client-based folder 106 of the secondary candidate client device 108, 202, the routine 824 may proceed to the step 806(1), at which the synchronization engine 602 may select one or more other files 110 (which were previously assigned to the client-based folder 106 of the primary client device 108, 202) that are to be "evicted" from the client-based folder 106 to make room for the first portion of the newly-uploaded file 110. An example implementation of the step 806(1) is described above in connection with the step 806 of the routine 714 shown in FIG. 8.

At a step 1004 of the routine 824 (shown in FIG. 10), the synchronization engine 602 may assign the first portion of the newly-uploaded file 110 to the primary candidate client device 108, 202.

At a step/routine 810(1) of the routine 824 (shown in FIG. 10), the synchronization engine 602 may update the "file assignments" table 606 for the other candidate client devices 108, 202 that were identified at the step 716 of the routine 700 (shown in FIG. 7). Two alternative implementations of the step/routine 810(1) are shown in FIGS. 9A and 9B. The first alternative (designated as the step 810a in in FIG. 9A) may be applicable in an implementation in which files 110 are not permitted to be temporarily assigned to candidate client devices 108, 202. The second alternative (designated as a routine 810b in FIG. 9B) may be applicable in an implementation in which files 110 can be temporarily assigned to candidate client devices 108, 202. The operation of the routines 810a and 810b are described above in connection with FIGS. 9A and 9B, respectively.

At a decision step 1006 of the routine 824, the synchronization engine 602 may determine whether the available storage space in the client-based folder 106 on the secondary candidate client device 108, 202 is adequate to store a second portion of the newly-uploaded file 110.

When, at the decision step 1006, the synchronization engine 602 determines that there is not adequate available storage space for the second portion of newly-uploaded file 110 in the client-based folder 106 of the secondary candidate client device 108, 202, the routine 824 may proceed to the step 806(2), at which the synchronization engine 602 may select one or more other files 110 (which were previously assigned to the client-based folder 106 of the secondary client device 108, 202) that are to be "evicted" from the client-based folder 106 to make room for the second portion of the newly-uploaded file 110. An example implementation of the step 806(2) is described above in connection with the step 806 of the routine 714 shown in FIG. 8.

At a step 1008 of the routine 824 (shown in FIG. 10), the synchronization engine 602 may assign the second portion of the newly-uploaded file 110 to the secondary candidate client device 108, 202.

At a step/routine 810(2) of the routine 824 (shown in FIG. 10), the synchronization engine 602 may update the "file assignments" table 606 for the other candidate client devices 108, 202 that were identified at the step 716 of the routine 700 (shown in FIG. 7). Two alternative implementations of the step/routine 810(2) are shown in FIGS. 9A and 9B. The first alternative (designated as the step 810a in in FIG. 9A) may be applicable in an implementation in which files 110 are not permitted to be temporarily assigned to candidate client devices 108, 202. The second alternative (designated as a routine 810b in FIG. 9B) may be applicable in an implementation in which files 110 can be temporarily assigned to candidate client devices 108, 202. The operation of the routines 810a and 810b are described above in connection with FIGS. 9A and 9B, respectively.

As shown in FIG. 6, in addition to the synchronization engine 602 described in detail above, in some implementations, the unified storage management system 102 may include the file access engine 604. The file access engine 604 may, for example, be embodied by one or more processors and one or more computer-readable media associated with the access management server(s) 204a shown in FIGS. 5A and 5C. In some implementations, the one or more computer-readable media may be encoded with instructions which, when executed by the one or more processors, cause the file access engine 604 to perform a routine 1400 shown in FIG. 14. Although not shown in FIG. 6, it should be appreciated that the routine 1400 may additionally or alternatively be performed by one or more of the client devices 108, 202, e.g., (e.g., by the file management application 513 shown in FIG. 5A) using information in one of more of the tables 608, 610, 612, 614, and perhaps additional or different information, that the unified storage management system 102 provides to such client device(s) 108, 202. Accordingly, the file access engine 604 may, in some implementations, additionally or alternatively be embodied by a client device 108, 202.

Figure 14:
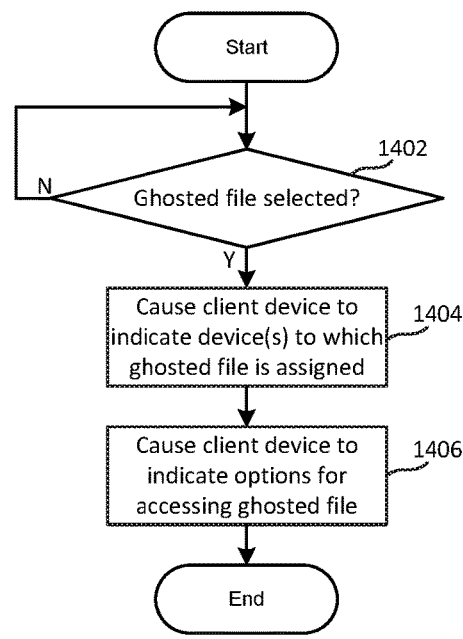
FIG. 14 shows an example routine that may be executed by the file access engine shown in FIG. 6.

As shown in FIG. 14, the routine 1400 may begin at a decision step 1402, when the file access engine 604 may determine that a user operating a client device 108, 202 seeks to access to a file that has been ghosted within the client-based folder 106 on that device. In some implementations, for example, when a user clicks on or hovers a mouse over an icon of a ghosted file 110, the client device 108, 202 may send a message to the file access engine 604 to inform the file access engine 604 of such an action. In other implementations, a user's selection of a ghosted icon may instead trigger the execution of the remainder of the routine 1400 via the client device 108, 202.

In any event, when the file access engine 604 detects selection of a ghosted icon (per the step 1402), the routine 1400 may proceed to a step 1404, at which the file access engine 604 may cause the client device 108, 202 to indicate to the user one or more other client device(s) 108, 202 to which the selected file 110 is currently assigned, e.g., by referencing the entries in a "file assignments" table 606 (shown in FIG. 6).

Further, at a step 1406 of the routine 1400, the file access engine 604 may additionally or alternatively cause the client device 108, 202 to identify for the user one or more possible processes the user may use to access the ghosted file 110. Such options may take on any of numerous forms and may be presented to the user in any of a number of ways. In some implementations, for example, the client device 108, 202 may present one or more selectable user interface elements, e.g., buttons, links, etc., that, when selected, may cause a corresponding process for accessing the ghosted file 110 to be automatically invoked.

In some implementations, the user may be apprised that the ghosted file 110 is located on another client device 108, 202 that is accessible via a local area network (LAN). In such a case, a process may be invoked to allow the file to be transferred quickly over the LAN. For example, in some implementations, the file access engine 604 may provide each client device 108, 202 with a secure encryption token that those client devices 108, 202 can use to securely transfer the file over the LAN.

Additionally or alternatively, the user may be apprised that the ghosted file 110 can be accessed using a virtual desktop session with the client device 108, 202 to which the ghosted file 110 is assigned. In such a case, the user may elect to open a virtual desktop session to access the file 110. In some implementations, a single sign-on service of the unified storage management system 102 (e.g., within the file sharing system 504 described above in connection with FIGS. 5A-C) to log into to the virtual desktop of the client device 108, 202 to which the ghosted file 110 is assigned.

Finally, the user may presented with an option to download the file from the unified storage management system 102, e.g., via the storage system 508 shown in FIGS. 5A-C. The user may select such an option, for example, if the other options are not available or practicable.

In some implementations, in response to a user accessing a file 110 using a client device 108, 202 other than the client device 108, 202 to which the file 110 is currently assigned, the file access engine 604 may, in at least some circumstances, alter the "file assignments" table 606 so as to re-assign the file 110 to the client device 108, 202 that accessed the file.

G. Example Implementations of Methods, Systems, and Computer-Readable Media in Accordance with the Present Disclosure The following paragraphs (M1) through (M9) describe examples of methods that may be implemented in accordance with the present disclosure.

(M1) A method may be performed that involves storing, by a computing system, a first file in a system repository that is to be synchronized with at least a first repository associated with a first client device and a second repository associated with a second client device; determining, by the computing system, that the first repository is to receive a downloaded copy of at least a portion of the first file; causing, by the computing system, a copy of the at least a portion of the first file to be downloaded from the system repository to the first repository; and based at least in part on the computing system determining that the first repository is to receive the downloaded copy, causing an identifier of the at least a portion of first file to be stored in the second repository without storing a copy of the at least a portion of the first file in the second repository.

(M2) A method may be performed as described in paragraph (M1), and my further involve storing, by the computing system, a second file in the system repository; determining, by the computing system, that the second repository is to receive a downloaded copy of at least a portion of the second file; causing, by the computing system, a copy of the at least a portion of the second file to be downloaded from the system repository to the second repository; and based at least in part on the computing system determining that the second repository is to receive the downloaded copy, causing an identifier of the at least a portion of the second file to be stored in the first repository without storing a copy of the at least a portion of the second file in the first repository.

(M3) A method may be performed as described in paragraph (M1) or paragraph (M2), and may further involve receiving, by the computing system, a request to upload a copy of the first file to the system repository; and receiving, by the computing system, an indication that the uploaded copy of the first file is to be assigned to the first client device; wherein determining that the first repository is to receive the downloaded copy may be based at least in part on the received indication.

(M4) A method may be performed as described in any of paragraphs (M1) through (M3), and may further involve determining, by the computing system, at least one characteristic of the first file; wherein determining that the first repository is to receive the downloaded copy may be based at least in part on the at least one determined characteristic of the first file.

(M5) A method may be performed as described in paragraph (M4), and my further involve determining, by the computing system, at least one characteristic of the first client device; wherein determining that the first repository is to receive the downloaded copy may be further based at least in part on the at least one determined characteristic of the first client device.

(M6) A method may be performed as described in any of paragraphs (M1) through (M5), and may further involve determining, by the computing system, at least one preference of a user, the at least one preference indicating that files having a first set of one or more characteristics are to be assigned to the first client device; and determining, by the computing system, that the first file has the first set of one or more characteristics; wherein determining that the first repository is to receive the downloaded copy of the first file may be based at least in part on the first file having the first set of one or more characteristics.

(M7) A method may be performed as described in any of paragraphs (M1) through (M6), and may further involve storing, by the computing system, a second file in the system repository; determining, by the computing system, that the first repository is to receive a downloaded copy of at least a portion of the second file; determining, by the computing system, that the first repository has insufficient storage space to accommodate an entirety of the second file; causing, by the computing system and based at least in part on the first repository having insufficient storage space to accommodate the entirety of the second file, the second file to be split into at least first and second portions; causing, by the computing system, a copy of the first portion to be downloaded from the system repository to the first repository; and causing, by the computing system, a copy of the second portion to be downloaded from the system repository to the second repository.

(M8) A method may be performed as described in any of paragraphs (M1) through (M7), and may further involve determining, after the identifier has been stored in the second repository, that access to the at least a portion of the first file by the second client device is sought; and in response to determining that access to the at least a portion of the first file by the second client device is sought, causing the second client device to output an indication that a copy of the at least a portion of the first file is stored in the first repository.

(M9) A method may be performed as described in any of paragraphs (M1) through (M9), and may further involve, determining, after the identifier has been stored in the second repository, that access to the at least a portion of the first file by the second client device is sought; and in response to determining that access to the at least a portion of the first file by the second client device is sought, causing the second client device to present at least one option for a user of the second client device to cause the at least a portion of the first file to be made accessible to the second client device.

The following paragraphs (S1) through (S9) describe examples of systems and devices that may be implemented in accordance with the present disclosure.

(S1) A computing system may comprise at least one processor, and at least one computer-readable medium encoded with instructions which, when executed by the at least one processor, cause the computing system to store a first file in a system repository that is to be synchronized with at least a first repository associated with a first client device and a second repository associated with a second client device, to determine that the first repository is to receive a downloaded copy of at least a portion of the first file, to cause a copy of the at least a portion of the first file to be downloaded from the system repository to the first repository, and to cause, based at least in part on the computing system determining that the first repository is to receive the downloaded copy, an identifier of the at least a portion of first file to be stored in the second repository without storing a copy of the at least a portion of the first file in the second repository.

(S2) A computing system may be configured as described in paragraph (S1), and the at least one computer-readable medium may be encoded with additional instructions which, when executed by the at least one processor, further cause the computing system to store a second file in the system repository, to determine that the second repository is to receive a downloaded copy of at least a portion of the second file, to cause a copy of the at least a portion of the second file to be downloaded from the system repository to the second repository, and to cause, based at least in part on the computing system determining that the second repository is to receive the downloaded copy, an identifier of the at least a portion of the second file to be stored in the first repository without storing a copy of the at least a portion of the second file in the first repository.

(S3) A computing system may be configured as described in paragraph (S1) or paragraph (S2), and the at least one computer-readable medium may be encoded with additional instructions which, when executed by the at least one processor, further cause the computing system to receive a request to upload a copy of the first file to the system repository, to receive an indication that the uploaded copy of the first file is to be assigned to the first client device, and to determine that the first repository is to receive the downloaded copy based at least in part on the received indication.

(S4) A computing system may be configured as described in any of paragraphs (S1) through (S3), and the at least one computer-readable medium may be encoded with additional instructions which, when executed by the at least one processor, further cause the computing system to determining at least one characteristic of the first file, and to determine that the first repository is to receive the downloaded copy based at least in part on the at least one determined characteristic of the first file.

(S5) A computing system may be configured as described in paragraph (S4), and the at least one computer-readable medium may be encoded with additional instructions which, when executed by the at least one processor, further cause the computing system to determine at least one characteristic of the first client device, and to determine that the first repository is to receive the downloaded copy further based at least in part on the at least one determined characteristic of the first client device.

(S6) A computing system may be configured as described in any of paragraphs (S1) through (S5), and the at least one computer-readable medium may be encoded with additional instructions which, when executed by the at least one processor, further cause the computing system to determine at least one preference of a user, the at least one preference indicating that files having a first set of one or more characteristics are to be assigned to the first client device, to determine that the first file has the first set of one or more characteristics, and to determine that the first repository is to receive the downloaded copy of the first file based at least in part on the first file having the first set of one or more characteristics.

(S7) A computing system may be configured as described in any of paragraphs (S1) through (S6), and the at least one computer-readable medium may be encoded with additional instructions which, when executed by the at least one processor, further cause the computing system to store a second file in the system repository, to determine that the first repository is to receive a downloaded copy of at least a portion of the second file, to determine that the first repository has insufficient storage space to accommodate an entirety of the second file, to cause, based at least in part on the first repository having insufficient storage space to accommodate the entirety of the second file, the second file to be split into at least first and second portions, to cause a copy of the first portion to be downloaded from the system repository to the first repository, and to cause a copy of the second portion to be downloaded from the system repository to the second repository.

(S8) A computing system may be configured as described in any of paragraphs (S1) through (S7), and the at least one computer-readable medium may be encoded with additional instructions which, when executed by the at least one processor, further cause the computing system to determine, after the identifier has been stored in the second repository, that access to the at least a portion of the first file by the second client device is sought, and to cause, in response to determining that access to the at least a portion of the first file by the second client device is sought, the second client device to output an indication that a copy of the at least a portion of the first file is stored in the first repository.

(S9) A computing system may be configured as described in any of paragraphs (S1) through (S8), and the at least one computer-readable medium may be encoded with additional instructions which, when executed by the at least one processor, further cause the computing system to determine, after the identifier has been stored in the second repository, that access to the at least a portion of the first file by the second client device is sought, and to cause, in response to determining that access to the at least a portion of the first file by the second client device is sought, the second client device to present at least one option for a user of the second client device to cause the at least a portion of the first file to be made accessible to the second client device.

The following paragraphs (CRM1) through (CRM9) describe examples of computer-readable media that may be implemented in accordance with the present disclosure.

(CRM1) At least one non-transitory computer-readable medium may be encoded with instructions which, when executed by at least one processor of a computing system, cause the computing system to store a first file in a system repository that is to be synchronized with at least a first repository associated with a first client device and a second repository associated with a second client device, to determine that the first repository is to receive a downloaded copy of at least a portion of the first file, to cause a copy of the at least a portion of the first file to be downloaded from the system repository to the first repository, and to cause, based at least in part on the computing system determining that the first repository is to receive the downloaded copy, an identifier of the at least a portion of first file to be stored in the second repository without storing a copy of the at least a portion of the first file in the second repository.

(CRM2) At least one non-transitory computer-readable medium may be configured as described in paragraph (CRM1), and may be encoded with additional instructions which, when executed by the at least one processor, further cause the computing system to store a second file in the system repository, to determine that the second repository is to receive a downloaded copy of at least a portion of the second file, to cause a copy of the at least a portion of the second file to be downloaded from the system repository to the second repository, to cause, based at least in part on the computing system determining that the second repository is to receive the downloaded copy, an identifier of the at least a portion of the second file to be stored in the first repository without storing a copy of the at least a portion of the second file in the first repository.

(CRM3) At least one non-transitory computer-readable medium may be configured as described in paragraph (CRM1) or paragraph (CRM2), and may be encoded with additional instructions which, when executed by the at least one processor, further cause the computing system to receive a request to upload a copy of the first file to the system repository, to receive an indication that the uploaded copy of the first file is to be assigned to the first client device, and to determine that the first repository is to receive the downloaded copy based at least in part on the received indication.

(CRM4) At least one non-transitory computer-readable medium may be configured as described in any of paragraphs (CRM1) through (CRM3), and may be encoded with additional instructions which, when executed by the at least one processor, further cause the computing system to determining at least one characteristic of the first file, and to determine that the first repository is to receive the downloaded copy based at least in part on the at least one determined characteristic of the first file.

(CRM5) At least one non-transitory computer-readable medium may be configured as described in paragraph (CRM4), and may be encoded with additional instructions which, when executed by the at least one processor, further cause the computing system to determine at least one characteristic of the first client device, and to determine that the first repository is to receive the downloaded copy further based at least in part on the at least one determined characteristic of the first client device.

(CRM6) At least one non-transitory computer-readable medium may be configured as described in any of paragraphs (CRM1) through (CRM5), and may be encoded with additional instructions which, when executed by the at least one processor, further cause the computing system to determine at least one preference of a user, the at least one preference indicating that files having a first set of one or more characteristics are to be assigned to the first client device, to determine that the first file has the first set of one or more characteristics, and to determine that the first repository is to receive the downloaded copy of the first file based at least in part on the first file having the first set of one or more characteristics.

(CRM7) At least one non-transitory computer-readable medium may be configured as described in any of paragraphs (CRM1) through (CRM6), and may be encoded with additional instructions which, when executed by the at least one processor, further cause the computing system to store a second file in the system repository, to determine that the first repository is to receive a downloaded copy of at least a portion of the second file, to determine that the first repository has insufficient storage space to accommodate an entirety of the second file, to cause, based at least in part on the first repository having insufficient storage space to accommodate the entirety of the second file, the second file to be split into at least first and second portions, to cause a copy of the first portion to be downloaded from the system repository to the first repository, and to cause a copy of the second portion to be downloaded from the system repository to the second repository.

(CRM8) At least one non-transitory computer-readable medium may be configured as described in any of paragraphs (CRM1) through (CRM7), and may be encoded with additional instructions which, when executed by the at least one processor, further cause the computing system to determine, after the identifier has been stored in the second repository, that access to the at least a portion of the first file by the second client device is sought, and to cause, in response to determining that access to the at least a portion of the first file by the second client device is sought, the second client device to output an indication that a copy of the at least a portion of the first file is stored in the first repository.

(CRM9) At least one non-transitory computer-readable medium may be configured as described in any of paragraphs (CRM1) through (CRM8), and may be encoded with additional instructions which, when executed by the at least one processor, further cause the computing system to determine, after the identifier has been stored in the second repository, that access to the at least a portion of the first file by the second client device is sought, and to cause, in response to determining that access to the at least a portion of the first file by the second client device is sought, the second client device to present at least one option for a user of the second client device to cause the at least a portion of the first file to be made accessible to the second client device.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   storing, by a computing system, a first file in a system repository that is to be synchronized with at least a first repository associated with a first client device and a second repository associated with a second client device;
   determining, by the computing system, first data indicative of at least one of a file type of the first file, a purpose of the first file, or a content type of the first file;
   determining, by the computing system, second data indicative of at least one of a device type of the first client device, a purpose of the first client device, a percentage of time the first client device is used relative to other client devices, or a current available bandwidth between the first client device and the system repository;
   determining, by the computing system, third data indicative of at least one of a device type of the second client device, a purpose of the second client device, a percentage of time the second client device is used relative to other client devices, or a current available bandwidth between the second client device and the system repository;
   determining, by the computing system and based at least in part on the first data, the second data, and the third data, that the first client device is more likely to be used to access the first file than the second client device;
   determining, by the computing system and based at least in part on the first client device being more likely to be used to access the first file than the second client device, that the first repository is to receive a downloaded copy of at least a portion of the first file;
   causing, by the computing system, a copy of the at least a portion of the first file to be downloaded from the system repository to the first repository; and
   based at least in part on the computing system determining that the first repository is to receive the downloaded copy, causing an identifier of the at least a portion of first file to be stored in the second repository without storing a copy of the at least a portion of the first file in the second repository.

2. The method of claim 1, further comprising:
   storing, by the computing system, a second file in the system repository;
   determining, by the computing system, that the second client device is more likely to be used to access the second file than the first client device;
   determining, by the computing system and based at least in part on the second client device being more likely to be used to access the second file than the first client device, that the second repository is to receive a downloaded copy of at least a portion of the second file;
   causing, by the computing system, a copy of the at least a portion of the second file to be downloaded from the system repository to the second repository; and
   based at least in part on the computing system determining that the second repository is to receive the downloaded copy, causing an identifier of the at least a portion of the second file to be stored in the first repository without storing a copy of the at least a portion of the second file in the first repository.

3. The method of claim 1, further comprising:
   receiving, by the computing system, a request to upload a copy of the first file to the system repository; and
   receiving, by the computing system, an indication that the uploaded copy of the first file is to be assigned to the first client device;
   wherein determining that the first repository is to receive the downloaded copy is based at least in part on the received indication.

4. The method of claim 1, further comprising:
   determining, by the computing system, at least one preference of a user, the at least one preference indicating that files having a first set of one or more characteristics are to be assigned to the first client device; and
   determining, by the computing system, that the first file has the first set of one or more characteristics;
   wherein determining that the first repository is to receive the downloaded copy of the first file is based at least in part on the first file having the first set of one or more characteristics.

5. The method of claim 1, further comprising:
   storing, by the computing system, a second file in the system repository;
   determining, by the computing system, that the first client device is more likely to be used to access the second file than the second client device;
   determining, by the computing system and based at least in part on the first client device being more likely to be used to access the second file than the second client device, that the first repository is to receive a downloaded copy of at least a portion of the second file;
   determining, by the computing system, that the first repository has insufficient storage space to accommodate an entirety of the second file;
   causing, by the computing system and based at least in part on the first repository having insufficient storage space to accommodate the entirety of the second file, the second file to be split into at least first and second portions;

causing, by the computing system, a copy of the first portion to be downloaded from the system repository to the first repository; and causing, by the computing system, a copy of the second portion to be downloaded from the system repository to the second repository.

6. The method of claim 1, further comprising:

after the identifier has been stored in the second repository, determining that access to the at least a portion of the first file by the second client device is sought; and in response to determining that access to the at least a portion of the first file by the second client device is sought, causing the second client device to output an indication that a copy of the at least a portion of the first file is stored in the first repository.

7. The method of claim 1, further comprising:

after the identifier has been stored in the second repository, determining that access to the at least a portion of the first file by the second client device is sought; and in response to determining that access to the at least a portion of the first file by the second client device is sought, causing the second client device to present at least one option for a user of the second client device to cause the at least a portion of the first file to be made accessible to the second client device.

8. A computing system, comprising:

at least one processor; and at least one non-transitory computer-readable medium encoded with instructions which, when executed by the at least one processor, cause the computing system to:

store a first file in a system repository that is to be synchronized with at least a first repository associated with a first client device and a second repository associated with a second client device, determine first data indicative of at least one of a file type of the first file, a purpose of the first file, or a content type of the first file, determine second data indicative of at least one of a device type of the first client device, a purpose of the first client device, a percentage of time the first client device is used relative to other client devices, or a current available bandwidth between the first client device and the system repository, determine third data indicative of at least one of a device type of the second client device, a purpose of the second client device, a percentage of time the second client device is used relative to other client devices, or a current available bandwidth between the second client device and the system repository, determine, based at least in part on the first data, the second data, and the third data, that the first client device is more likely to be used to access the first file than the second client device, determine, based at least in part on the first client device being more likely to be used to access the first file than the second client device, that the first repository is to receive a downloaded copy of at least a portion of the first file, cause a copy of the at least a portion of the first file to be downloaded from the system repository to the first repository, and cause, based at least in part on the computing system determining that the first repository is to receive the downloaded copy, an identifier of the at least a portion of first file to be stored in the second repository without storing a copy of the at least a portion of the first file in the second repository.

9. The computing system of claim 8, wherein the at least one non-transitory computer-readable medium is encoded with additional instructions which, when executed by the at least one processor, further cause the computing system to:

store a second file in the system repository;

determine that the second client device is more likely to be used to access the second file than the first client device;

determine, based at least in part on the second client device being more likely to be used to access the second file than the first client device, that the second repository is to receive a downloaded copy of at least a portion of the second file;

cause a copy of the at least a portion of the second file to be downloaded from the system repository to the second repository; and cause, based at least in part on the computing system determining that the second repository is to receive the downloaded copy, an identifier of the at least a portion of the second file to be stored in the first repository without storing a copy of the at least a portion of the second file in the first repository.

10. The computing system of claim 8, wherein the at least one non-transitory computer-readable medium is encoded with additional instructions which, when executed by the at least one processor, further cause the computing system to:

receive a request to upload a copy of the first file to the system repository;

receive an indication that the uploaded copy of the first file is to be assigned to the first client device; and determine that the first repository is to receive the downloaded copy based at least in part on the received indication.

11. The computing system of claim 8, wherein the at least one non-transitory computer-readable medium is encoded with additional instructions which, when executed by the at least one processor, further cause the computing system to:

determine at least one preference of a user, the at least one preference indicating that files having a first set of one or more characteristics are to be assigned to the first client device;

determine that the first file has the first set of one or more characteristics; and determine that the first repository is to receive the downloaded copy of the first file based at least in part on the first file having the first set of one or more characteristics.

12. The computing system of claim 8, wherein the at least one non-transitory computer-readable medium is encoded with additional instructions which, when executed by the at least one processor, further cause the computing system to:

store a second file in the system repository;

determine that the first client device is more likely to be used to access the second file than the second client device;

determine, based at least in part on the first client device being more likely to be used to access the second file than the second client device, that the first repository is to receive a downloaded copy of at least a portion of the second file;

determine that the first repository has insufficient storage space to accommodate an entirety of the second file;

cause, based at least in part on the first repository having insufficient storage space to accommodate the entirety of the second file, the second file to be split into at least first and second portions;

cause a copy of the first portion to be downloaded from the system repository to the first repository; and cause a copy of the second portion to be downloaded from the system repository to the second repository.

13. The computing system of claim 8, wherein the at least one non-transitory computer-readable medium is encoded with additional instructions which, when executed by the at least one processor, further cause the computing system to:

after the identifier has been stored in the second repository, determine that access to the at least a portion of the first file by the second client device is sought; and cause, in response to determining that access to the at least a portion of the first file by the second client device is sought, the second client device to output an indication that a copy of the at least a portion of the first file is stored in the first repository.

14. The computing system of claim 8, wherein the at least one non-transitory computer-readable medium is encoded with additional instructions which, when executed by the at least one processor, further cause the computing system to:

after the identifier has been stored in the second repository, determine that access to the at least a portion of the first file by the second client device is sought; and cause, in response to determining that access to the at least a portion of the first file by the second client device is sought, the second client device to present at least one option for a user of the second client device to cause the at least a portion of the first file to be made accessible to the second client device.

15. At least one non-transitory computer-readable medium encoded with instructions which, when executed by at least one processor of a computing system, cause the computing system to:

store a first file in a system repository that is to be synchronized with at least a first repository associated with a first client device and a second repository associated with a second client device;

determine first data indicative of at least one of a file type of the first file, a purpose of the first file, or a content type of the first file;

determine second data indicative of at least one of a device type of the first client device, a purpose of the first client device, a percentage of time the first client device is used relative to other client devices, or a current available bandwidth between the first client device and the system repository;

determine third data indicative of at least one of a device type of the second client device, a purpose of the second client device, a percentage of time the second client device is used relative to other client devices, or a current available bandwidth between the second client device and the system repository;

determine, based at least in part on the first data, the second data, and the third data, that the first client device is more likely to be used to access the first file than the second client device;

determine, based at least in part on the first client device being more likely to be used to access the first file than the second client device, that the first repository is to receive a downloaded copy of at least a portion of the first file;

cause a copy of the at least a portion of the first file to be downloaded from the system repository to the first repository; and cause, based at least in part on the computing system determining that the first repository is to receive the downloaded copy, an identifier of the at least a portion of first file to be stored in the second repository without storing a copy of the at least a portion of the first file in the second repository.

16. The at least one non-transitory computer-readable medium of claim 15, further encoded with additional instructions which, when executed by the at least one processor, further cause the computing system to:

store a second file in the system repository;

determine that the second client device is more likely to be used to access the second file than the first client device;

determine, based at least in part on the second client device being more likely to be used to access the second file than the first client device, that the second repository is to receive a downloaded copy of at least a portion of the second file;

cause a copy of the at least a portion of the second file to be downloaded from the system repository to the second repository; and cause, based at least in part on the computing system determining that the second repository is to receive the downloaded copy, an identifier of the at least a portion of the second file to be stored in the first repository without storing a copy of the at least a portion of the second file in the first repository.

17. The method of claim 1, wherein the first data is indicative of the file type of the first file.

18. The method of claim 1, wherein the first data is indicative of the purpose of the first file.

19. The method of claim 1, wherein the first data is indicative of the content type of the first file.

20. The method of claim 1, wherein:

the second data is indicative of the device type of the first client device; and the third data is indicative of the device type of the second client device.

21. The method of claim 1, wherein:

the second data is indicative of the purpose of the first client device; and the third data is indicative of the purpose of the second client device.

* * * * *